(12) United States Patent
Araki et al.

(10) Patent No.: US 9,347,644 B2
(45) Date of Patent: May 24, 2016

(54) LENS AND LIGHT SOURCE UNIT

(75) Inventors: Ryoh Araki, Osaka (JP); Kei Oyobe, Osaka (JP); Yoshinobu Hirayama, Osaka (JP); Toshihiro Yanagi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 270 days.

(21) Appl. No.: 14/112,726

(22) PCT Filed: Apr. 16, 2012

(86) PCT No.: PCT/JP2012/060237
§ 371 (c)(1),
(2), (4) Date: Nov. 1, 2013

(87) PCT Pub. No.: WO2012/144448
PCT Pub. Date: Oct. 26, 2012

(65) Prior Publication Data
US 2014/0286019 A1 Sep. 25, 2014

(30) Foreign Application Priority Data
Apr. 22, 2011 (JP) ................................ 2011-096586

(51) Int. Cl.
*F21V 5/04* (2006.01)
*G02B 19/00* (2006.01)
(Continued)

(52) U.S. Cl.
CPC . *F21V 5/045* (2013.01); *F21V 5/04* (2013.01); *F21V 13/04* (2013.01); *F21V 14/003* (2013.01);
(Continued)

(58) Field of Classification Search
CPC ....... H04N 9/3155; G02F 1/13; G02F 1/1335; G02F 1/133512; G02F 1/133526; G02F 1/133509;
(Continued)

(56) References Cited

U.S. PATENT DOCUMENTS 8,139,172 B2 * 3/2012 Soh .................... G02B 27/2214
349/112
2005/0286252 A1 12/2005 Hanano
(Continued)

FOREIGN PATENT DOCUMENTS

| JP | 2002-049326 A | 2/2002 |
| JP | 2004-165352 A | 6/2004 |

(Continued)

OTHER PUBLICATIONS

Official Communication issued in International Patent Application No. PCT/JP2012/060237, mailed on Jul. 24, 2012.

*Primary Examiner* — Thoi Duong
(74) *Attorney, Agent, or Firm* — Keating & Bennett, LLP

(57) ABSTRACT

A lens cap (3) is arranged to cover a light-emitting surface (23) of a light source (2), the lens thereby guiding light from the light source (2) in oblique directions relative to the light source (2). The lens cap (3) includes, in a planar view, a light transmitting region (33) and a light blocking region (34), the light transmitting region (33) divided into a plurality of light transmitting regions by the light blocking region (34) so that the light from the light source (2) passes through the plurality of light transmitting regions (33) and is separated into beams traveling in different directions.

6 Claims, 21 Drawing Sheets

(51) Int. Cl.
*F21V 13/04* (2006.01)
*F21V 14/00* (2006.01)
*F21V 14/08* (2006.01)
*G02B 5/00* (2006.01)
*G02F 1/1335* (2006.01)
*G02F 1/1347* (2006.01)

(52) U.S. Cl.
CPC ........... *F21V 14/08* (2013.01); *G02B 5/001* (2013.01); *G02B 19/0023* (2013.01); *G02B 19/0061* (2013.01); *G02F 1/133606* (2013.01); *G02F 1/133611* (2013.01); *G02F 1/1347* (2013.01); *G02F 1/133603* (2013.01); *G02F 2001/133601* (2013.01); *G02F 2001/133607* (2013.01)

(58) Field of Classification Search
CPC ............ G02F 1/133606; G02F 1/1347; G02F 1/133605; G02F 1/133615; G02F 1/1323; G02F 1/29; G02F 1/292; G02F 1/133504; G02F 1/133553; G02F 1/1336; G02F 1/133603; G02F 1/133602; G02F 2001/133607; G02F 2001/133562; G09G 3/3406; G09G 3/3648; G09G 3/36; G09G 2320/0626; G09G 2320/0646; G09G 2320/066; G09G 2320/068; G09G 2360/16; H01L 27/14625; H01L 29/78633; H01L 31/0232; H01L 33/58; G03B 21/006; G03B 21/2066; G03B 7/095; F21V 5/04; F21V 13/04; F21V 14/003; F21V 7/00; H01J 2329/897; F21S 48/125; F21S 48/1258; F21S 48/145; F21S 48/1731; G06K 2007/10485; G06K 7/10831

USPC ......... 349/200, 202, 1, 5, 62, 64, 96, 193, 61, 349/65, 95, 110, 33, 67; 345/102, 84, 87; 359/463, 613, 614, 619, 885; 362/311.01, 311.06, 326, 97.1, 296.01, 362/321, 327, 335, 339, 520, 607, 611, 613

See application file for complete search history.

(56) References Cited

U.S. PATENT DOCUMENTS

| | | | |
|---|---|---|---|
| 2007/0086211 A1* | 4/2007 | Beeson | G02F 1/133603 362/628 |
| 2008/0089068 A1 | 4/2008 | Mimura et al. | |
| 2009/0040426 A1 | 2/2009 | Mather et al. | |

FOREIGN PATENT DOCUMENTS

| | | |
|---|---|---|
| JP | 2006-40861 A | 2/2006 |
| JP | 2008-71856 A | 3/2008 |
| JP | 2008-116913 A | 5/2008 |
| JP | 2009-218243 A | 9/2009 |

* cited by examiner

LENS AND LIGHT SOURCE UNIT

TECHNICAL FIELD

The present invention relates to (i) a lens to cover a light-emitting surface of a light source to thereby guide light from the light source in oblique directions, and (ii) a light source unit which includes the lens.

BACKGROUND ART

In recent years, devices such as liquid crystal TVs (television sets) have been becoming larger. Many display devices for use in such liquid crystal display TVs etc. employ a backlight constituted by a direct surface light source device. According to such a surface light source device, light sources can be arranged all over the back surface of a liquid crystal panel, and thus high luminance is easily achieved even in the case where the liquid crystal panel has a large screen.

Many of such backlights include, as a light source, solid-state light-emitting elements such as LEDs, for the purpose of reducing the thickness of the display devices and also reducing electric power consumption.

FIG. 29 is a cross-sectional view schematically illustrating a configuration of a liquid crystal display device 300 which includes a backlight 330 constituted by a direct surface light source device.

As illustrated in FIG. 29, the backlight 330 includes a plurality of LEDs 331 which are covered with lens caps (not illustrated). The LEDs 331 are arranged, for example, in a plurality of lines in a matrix manner or in a zigzag pattern on a backlight substrate (not illustrated) which has substantially the same shape as a liquid crystal panel 310.

The backlight substrate further has, for example on the entire surface thereof, a reflecting member 332 such as a reflecting sheet so that light is more efficiently reflected at the backlight substrate.

Note that, as described above, each of the LEDs 331 is covered with a lens cap (not illustrated), and light emitted from each of the LEDs 331 passes through the lens cap and illuminates a surface (which is to be irradiated by the light) of the liquid crystal panel 310 (such an object irradiated with light is hereinafter referred to as an irradiation target). Note, however, that FIG. 29 does not illustrate the lens cap for simplification.

Furthermore, between the LEDs 331 and the liquid crystal panel 310, there is provided a diffusing plate 320 for diffusing light, for the purpose of (i) preventing light and dark luminance patterns (i.e., spots of LEDs) due to bright lines attributed to the LEDs 331 and (ii) suppressing in-plane unevenness of luminance.

Note that, in FIG. 29, the arrow represents the path of light emitted from the backlight 330.

A known example of such a direct backlight 330 including the LEDs 331 as light sources is a flat surface light source described in Patent Literature 1.

FIG. 28 is a perspective view schematically illustrating a flat surface light source 400 described in Patent Literature 1.

As illustrated in FIG. 28, the flat surface light source 400 described in Patent Literature 1 includes (i) a plurality of LED chips 401 arranged on a flat surface and (ii) a microlens array 411 provided so that its microlenses correspond to light emitted from the respective plurality of LED chips 401.

In Patent Literature 1, a front substrate 412, on which the microlens array 411 (which serves as lens caps) is provided so that its microlenses correspond to the respective plurality of LED chips 401, is provided on a backside substrate 402 on which the LED chips 401 are arranged. With this configuration, light emitted from the LED chips 401 is collimated when passing through the microlens array 411, and collimated light is emitted to the outside.

CITATION LIST

Patent Literature

Patent Literature 1
Japanese Patent Application Publication, Tokukai No. 2002-49326 A (Publication Date: Feb. 15, 2002)

SUMMARY OF INVENTION

Technical Problem

According to the flat surface light source 400 which includes such a microlens array 411, light which has passed through the microlens array 411 travels only in a direction substantially perpendicular to the flat surface and does not travel in oblique directions (e.g., at angles of ±45°) relative to the LED chips 401.

FIG. 30 is a graph showing a relationship between viewing angles and luminance levels in a liquid crystal device employing the conventional direct backlight 330.

As shown in FIG. 30, the conventional direct backlight 330 has its peak luminance in front of it, because the liquid crystal display device is to be viewed from front.

As described above, generally, the conventional direct backlight 330 has its peak luminance in front of it, and the luminance level decreases with increase in the viewing angle.

Therefore, in a case where such a backlight 330 is used in a dual-view liquid crystal display device whose display screen is to be viewed from an oblique angle (e.g., ±45°), display quality deteriorates, because the display screen is viewed not from in front but from the oblique angle in practice and thus, as shown in FIG. 30, the luminance level significantly decreases.

In the conventional direct backlight 330, for example, the luminance level decreases to as low as 40% of the peak luminance when the viewing angle is 45°.

Therefore, for example, according to the conventional direct backlight 330 which is similar to the flat surface light source 400 described in Patent Literature 1, there is a peak luminance in front of the conventional direct backlight 330 as described above, and therefore light is not emitted in oblique directions (e.g., ±45°).

However, in a case where the liquid crystal display device 300 is a dual-view liquid crystal display device, it is viewed from an oblique angle (e.g., ±45°). In view of this, the backlight needs to have its peak luminance in oblique directions.

In this regard, the conventional direct backlight 330 is designed to, with use of a diffusing plate 320 and the like, diffuse light that travels straight from the LEDs 331 so that (i) in-plane uniformity of the backlight 330 improves and (ii) the spots of the LEDs 331 disappear. However, this is the only configuration that the conventional direct-type backlight 330 has in order to solve the above problem.

That is, the conventional direct backlight 330 is not configured to have its peak luminance in oblique directions so as to be suitable for use in the dual-view liquid crystal display device. Therefore, the conventional direct-type backlight 330 is not suitable for use in the dual-view liquid crystal display device.

The present invention has been accomplished in view of the conventional problem, and an object of the present invention is to provide (i) a lens which guides light emitted from a light source in oblique directions and (ii) a light source unit including the lens.

Solution to Problem

In order to attain the foregoing object, a lens in accordance with the present invention is a lens to cover a light-emitting surface of a light source, the lens thereby guiding light from the light source in oblique directions relative to the light source, the lens including, in a planar view: a light transmitting region which transmits the light from the light source; and a light blocking region which blocks the light from the light source, the light transmitting region being divided into a plurality of light transmitting regions by the light blocking region so that the light from the light source passes through the plurality of light transmitting regions and is separated into beams traveling in different directions.

According to the configuration, the light transmitting region is divided into the plurality of light transmitting regions by the light blocking region so that the light from the light source passes through the plurality of light transmitting regions and is thereby separated into beams traveling in different directions in a planar view. This makes it possible to cause the light from the light source to be separated into beams travelling in oblique directions relative to the light source and to cause the lens provided so as to cover a light-emitting surface of the light source to have its peak luminance in the oblique directions.

Therefore, according to the configuration, it is possible to provide a lens that achieves a light source unit suitable for applications which require oblique-direction light directivity, such as a backlight for a dual-view or quartet-view liquid crystal display device.

In order to attain the above object, a lens of the present invention is a lens to cover a light-emitting surface of a light source, the lens thereby guiding light from the light source in oblique directions relative to the light source, wherein a light incident surface of the lens, through which surface the light from the light source enters the lens, has a concave shape that is curved more sharply than the light-emitting surface of the light source.

According to the configuration, the light incident surface of the lens, through which surface the light from the light source enters the lens, has a concave shape that is curved more sharply than the light-emitting surface of the light source. This makes it possible to cause the light from the light source to be separated into beams travelling in oblique directions relative to the light source and to cause the lens provided so as to cover the light-emitting surface of the light source to have its peak luminance in the oblique directions.

Therefore, it is possible to provide a lens that achieves a light source unit suitable for applications which require oblique-direction light directivity, such as a backlight for a dual-view liquid crystal display device.

In order to attain the foregoing object, a lens in accordance with the present invention is a lens to cover a light-emitting surface of a light source, the lens thereby guiding light from the light source in oblique directions relative to the light source, the lens including: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line.

According to the configuration, light which has entered the lens through the first light incident surface exits through the first light exit surface facing the first light incident surface. Furthermore, light which has entered the lens through the second light incident surface exits through the second light exit surface facing the second light incident surface.

Therefore, the above configuration makes it possible to cause the light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a lens that achieves a light source unit suitable for applications which require oblique-direction light directivity, such as a backlight for a dual-view liquid crystal display device.

A light source unit in accordance with the present invention is a light source unit including: a light source; and a lens which covers a light-emitting surface of the light source, the lens being any one of the lenses described above.

According to the configuration, it is possible to cause the light from the light source to be separated into beams travelling in oblique directions relative to the light source and to cause the lens provided so as to cover the light-emitting surface of the light source to have its peak luminance in the oblique directions.

Therefore, it is possible to provide a light source unit suitable for applications which require oblique-direction light directivity, such as a backlight for a dual-view or quartet-view liquid crystal display device.

Alternatively, a light source unit in accordance with the present invention is a light source unit including: a light source; and a lens which covers a light-emitting surface of a light source, the lens being configured as below.

That is, the lens is a lens to cover a light-emitting surface of a light source, the lens thereby guiding light from the light source in oblique directions relative to the light source, the lens including: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line, at least one of the light incident surface and the light exit surface having a convex shape, and the lens having its first-light-incident-surfaces-side focal point and second-light-incident-surface-side focal point each of which coincides with a center of light emission of the light source.

A light beam from a focal point of a convex lens becomes a straight beam parallel to an optical axis of the convex lens after passing through the convex lens.

Therefore, according to the configuration, light which has been emitted from the center of light emission of the light source and entered the lens through the first light incident surface exits through the first light exit surface so as to be parallel to the optical axis of the lens. Light which has been emitted from the center of light emission of the light source and entered the lens through the second light incident surface exits through the second light exit surface so as to be parallel to the optical axis of the lens.

Thus, it is possible to cause the light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity, such as a backlight for a dual-view liquid crystal display device.

Furthermore, the light which has exited through the first light exit surface and the light which has exited through the second light exit surface each travel straight toward an irradiation area of an irradiation target without crossing the optical axis of the light source.

Therefore, according to the configuration, it is possible to efficiently cause light to exit from the lens in the oblique directions and possible to easily control directions in which light exits.

Alternatively, a light source unit of the present invention is a light source unit including: a light source; and a lens which covers a light-emitting surface of a light source, the lens being configured as below.

That is, the lens is a lens to cover a light-emitting surface of a light source, the lens thereby guiding light from the light source in oblique directions relative to the light source, the lens including: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line, and at least one of the light incident surface and the light exit surface having a convex shape. The light source unit includes a reflector having a concave shape, the reflector being positioned so that a center of light emission of the light source is between the reflector and the lens, and an imaginary focal point coinciding with a first-and-second-light-incident-surfaces-side focal point of the lens, the imaginary focal point being a point where light emitted from the center of light emission of the light source and reflected at the reflector is focused on a side of the reflector which side is opposite to the center of light emission of the light source.

A light beam from a focal point of a convex lens becomes a straight beam parallel to an optical axis of the convex lens after passing through the convex lens.

Therefore, according to the configuration, light which has been emitted from the center of light emission of the light source and entered the lens through the first light incident surface exits through the first light exit surface so as to be parallel to the optical axis of the lens. Similarly, light which has been emitted from the center of light emission of the light source and entered the lens through the second light incident surface exits through the second light exit surface so as to be parallel to the optical axis of the lens.

Thus, it is possible to cause light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity, such as a backlight for a dual-view liquid crystal display device.

Furthermore, the light which has exited through the first light exit surface and the light which has exited through the second light exit surface each travel straight toward an irradiation area of an irradiation target without crossing the optical axis of the light source.

Therefore, according to the configuration, it is possible to efficiently cause light to exit from the lens in the oblique directions and possible to easily control directions in which light exits.

Alternatively, a light source unit of the present invention is a light source unit including: a light source; and a lens which covers a light-emitting surface of a light source, the lens being configured as below.

That is, the lens is a lens to cover a light-emitting surface of a light source, the lens thereby guiding light from the light source in oblique directions relative to the light source, the lens comprising: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line; and a first-and-second-light-incident-surfaces-side focal point of the lens being positioned behind a center of light emission of the light source when viewed from a surface of the lens.

According to the configuration, light which has entered the lens through the first light incident surface exits through the first light exit surface, and light which has entered the lens through the second light incident surface exits through the second light exit surface.

Thus, it is possible to cause light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity, such as a backlight for a dual-view liquid crystal display device.

Furthermore, according to the configuration, since a focal point of the lens, which focal point is on the first and second light incident surfaces side, is behind the center of light emission of the light source when viewed from a surface of the lens, light which exits through the first and second light exit surfaces is focused in an irradiation region of an irradiation target without crossing the optical axis of the light source.

Therefore, it is possible to further increase the peak luminance in oblique directions and also possible to easily control a direction in which light exits.

Advantageous Effects of Invention

According to the present invention, it is possible to cause the light from the light source to be separated into beams travelling in oblique directions relative to the light source and to cause the lens provided so as to cover a light-emitting surface of the light source to have its peak luminance in the oblique directions.

Therefore, the present invention can provide (i) a lens that achieves a light source unit suitable for applications which require oblique-direction light directivity, such as a backlight for a dual-view liquid crystal display device and (ii) the light source unit.

BRIEF DESCRIPTION OF DRAWINGS (a) of FIG. 1 is a cross-sectional view schematically illustrating a configuration of a light source unit in accordance with Embodiment 1 of the present invention, and (b) of FIG. 1 is a plan view schematically illustrating the configuration of the light source unit in accordance with Embodiment 1 of the present invention.

Figure 16:
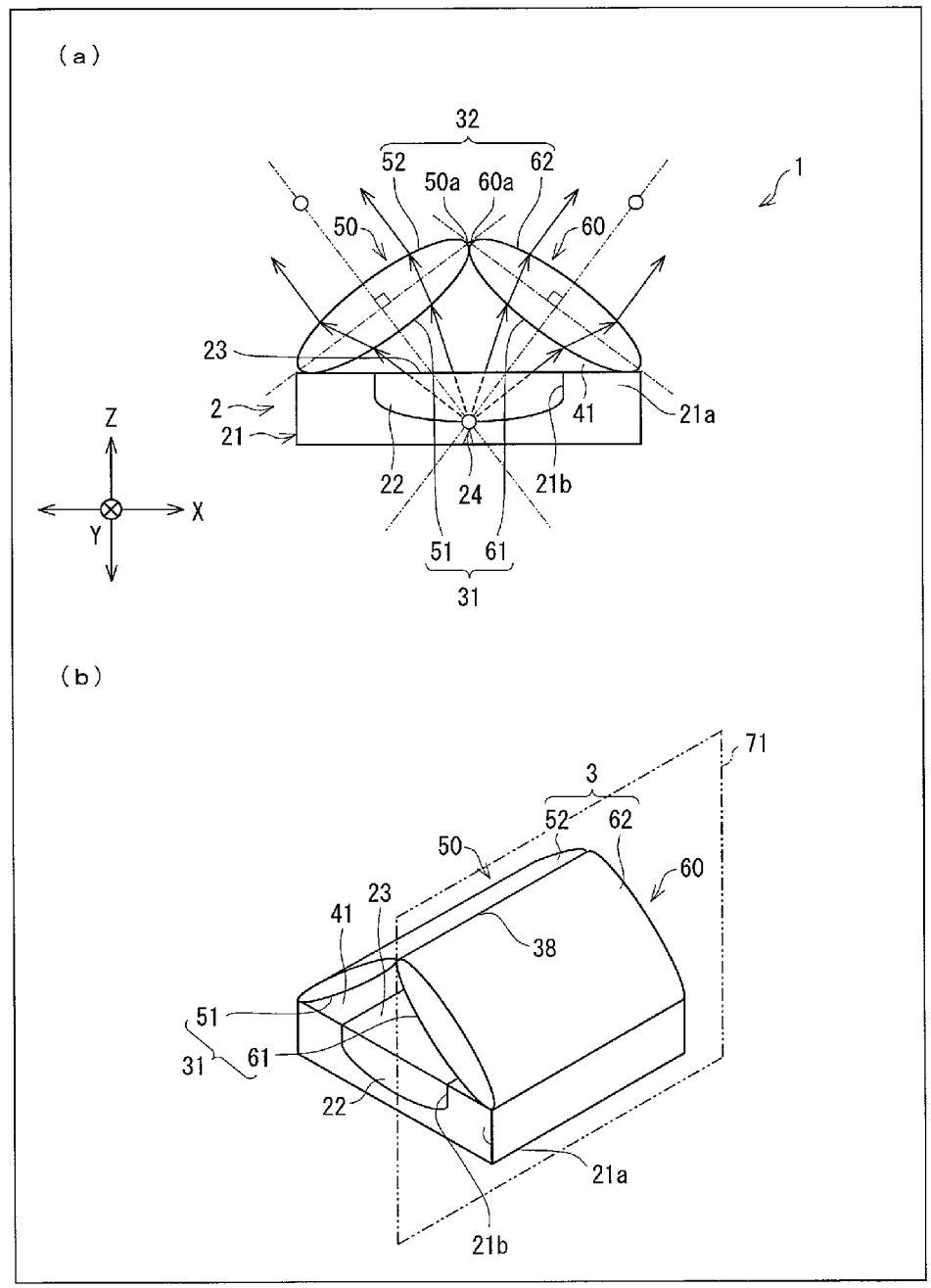

(a) of FIG. 16 is a cross-sectional view schematically illustrating a configuration of a light source unit in accordance with Embodiment 9 of the present invention, and (b) of FIG. 16 is a perspective view schematically illustrating the configuration of the light source unit in accordance with Embodiment 9 of the present invention.

Figure 17:
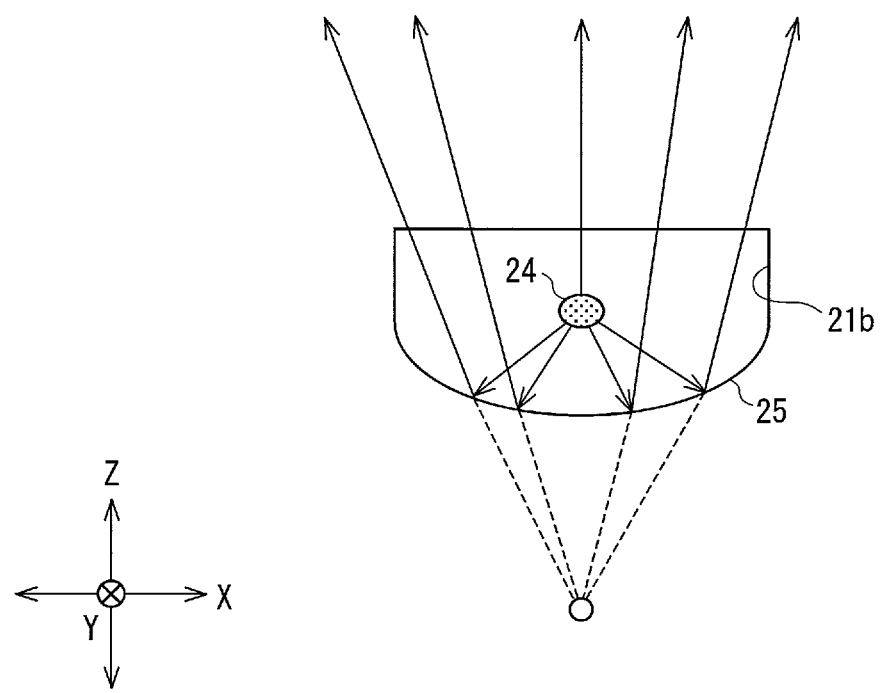

FIG. 17, showing the light source unit in accordance with Embodiment 9 of the present invention, is a cross-sectional view schematically illustrating a relationship between (i) a light emission center of a light source and (ii) an imaginary focal point of a first lens and a second lens.

Figure 18:
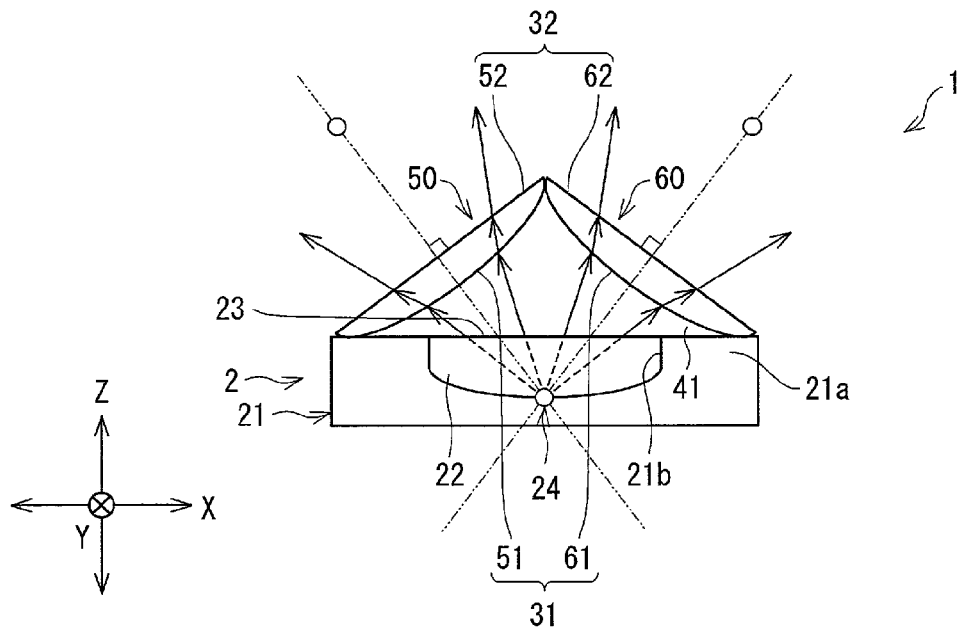

FIG. 18 is a cross-sectional view schematically illustrating a configuration of a light source unit in accordance with Embodiment 10 of the present invention.

Figure 19:
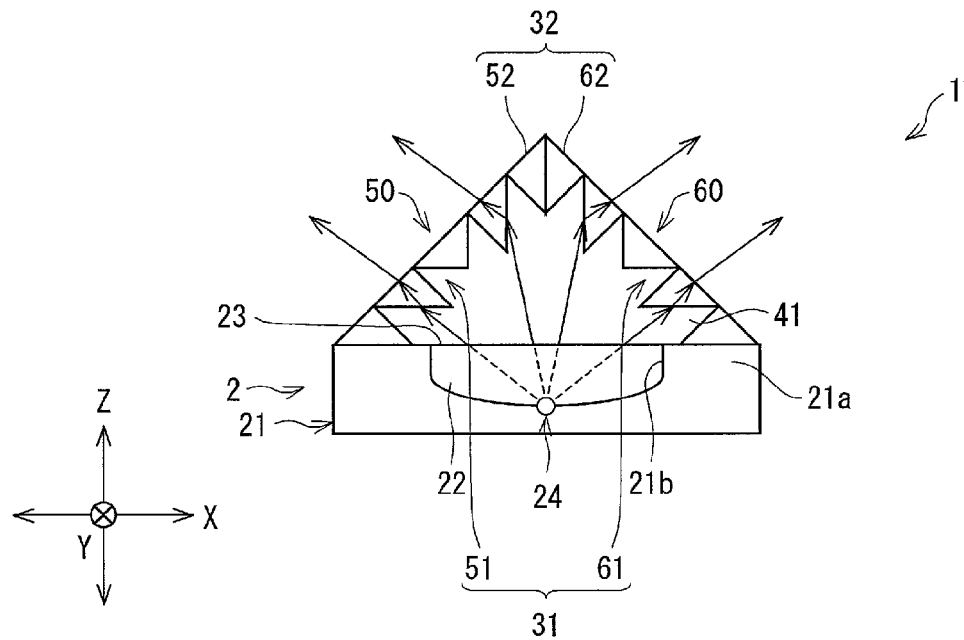

FIG. 19 is a cross-sectional view schematically illustrating an example of a configuration of a light source unit in accordance with Embodiment 11 of the present invention.

Figure 20:
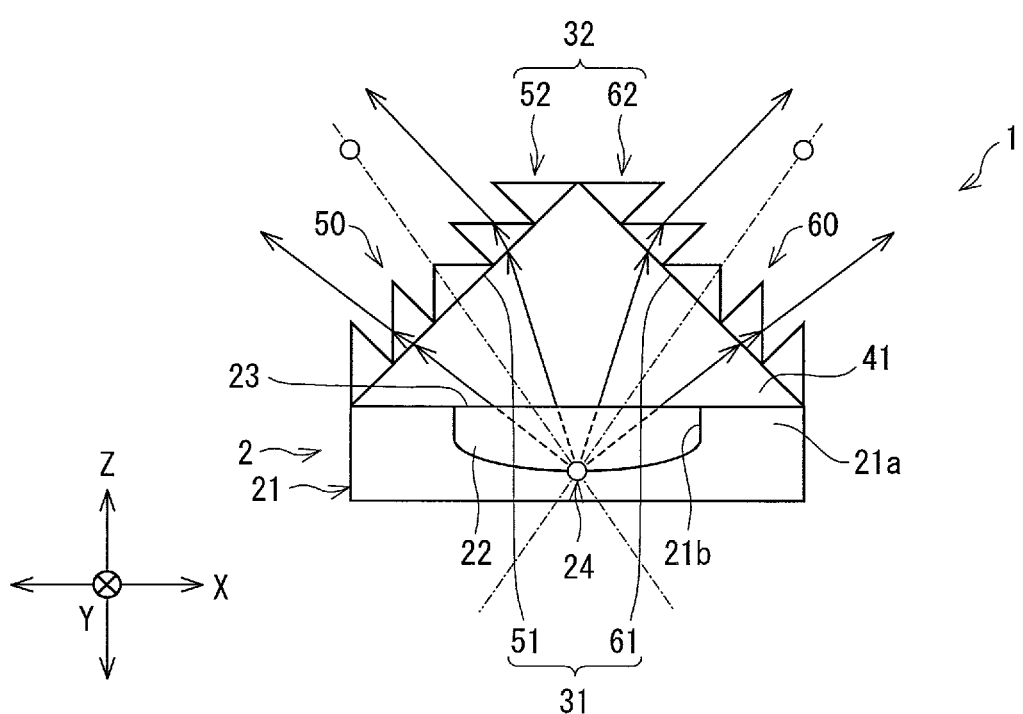

FIG. 20 is a cross-sectional view schematically illustrating another example of a configuration of the light source unit in accordance with Embodiment 11 of the present invention.

Figure 21:
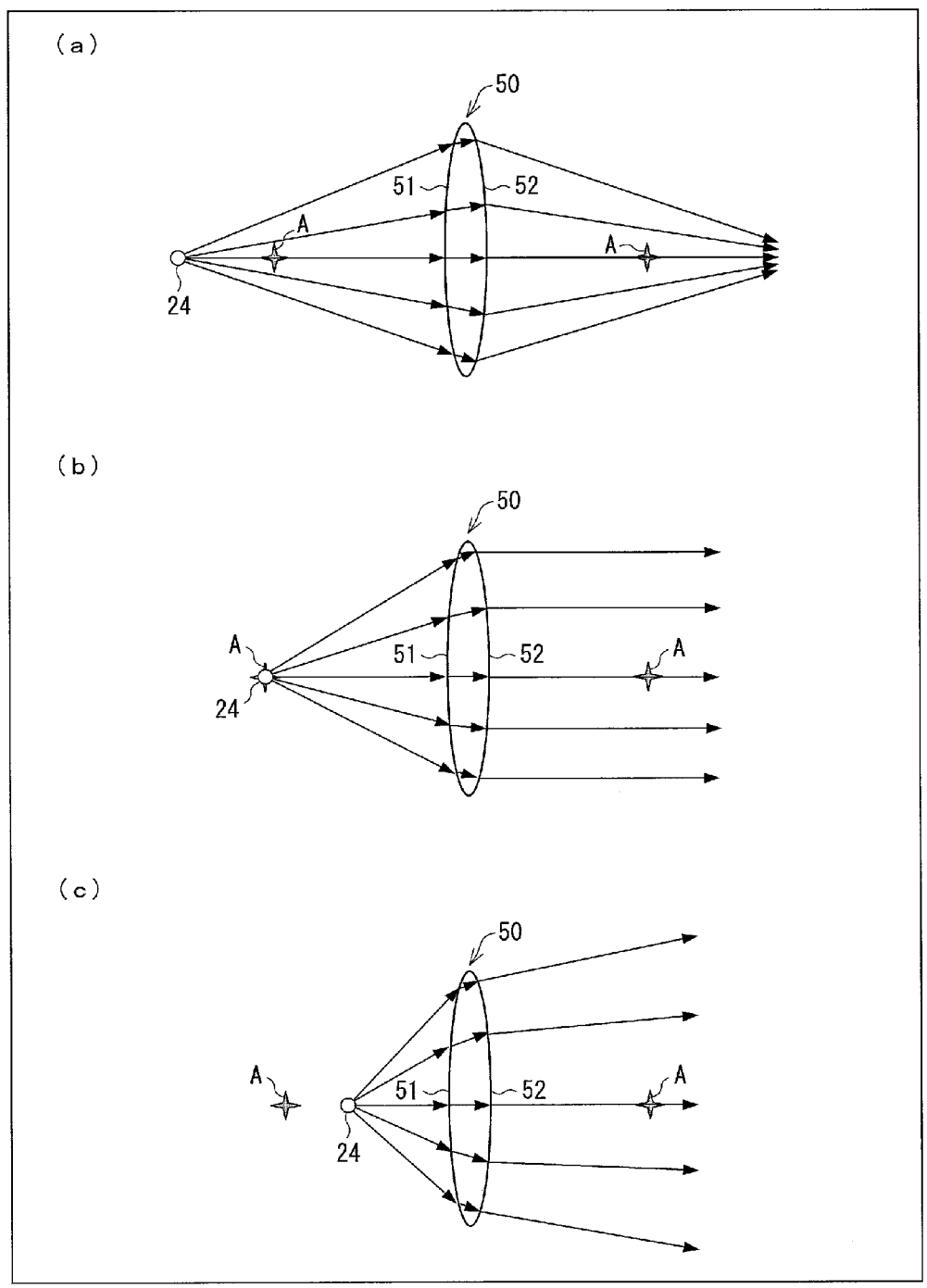
Figure 22:
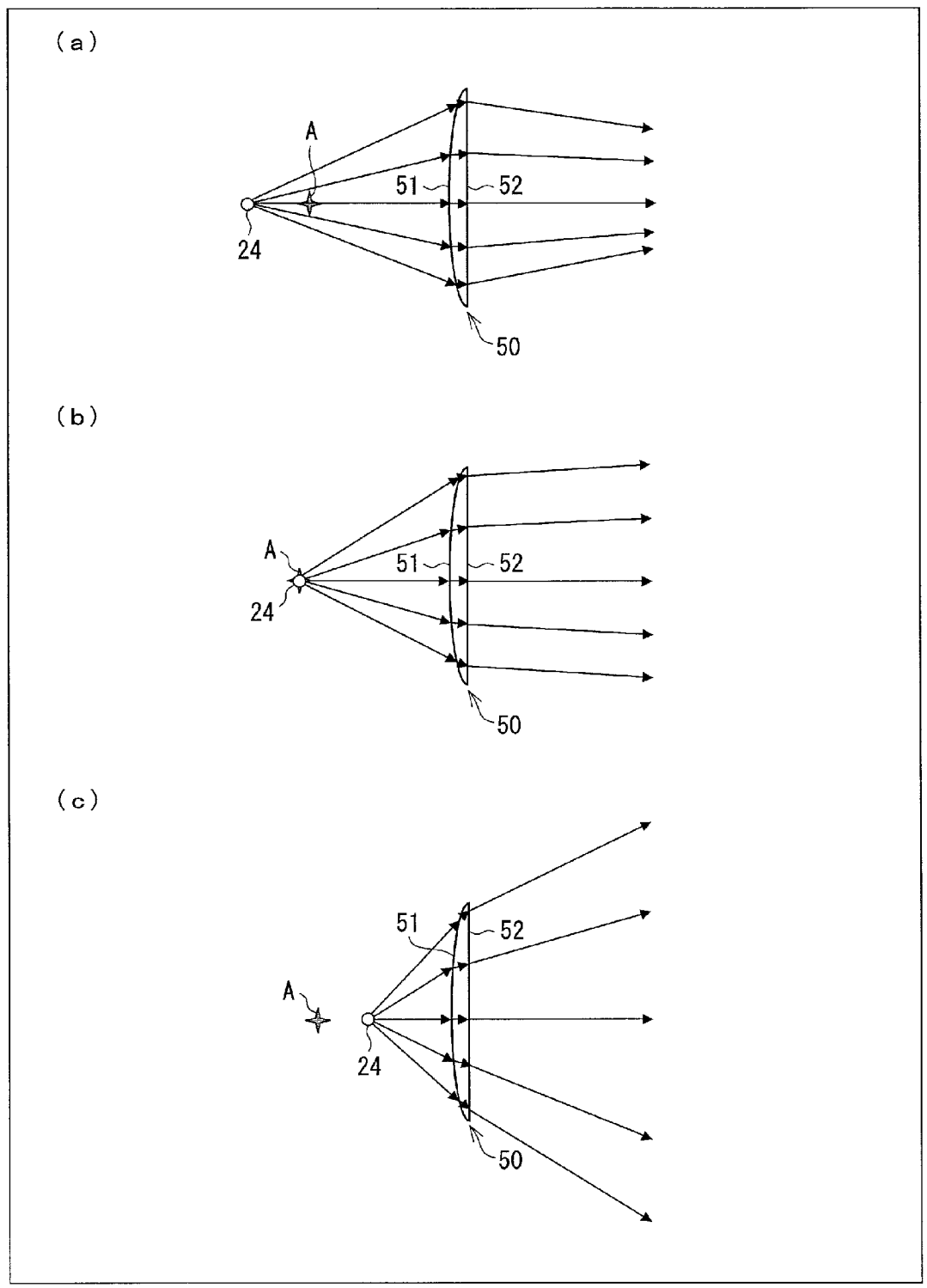

(a) to (c) of FIG. 21, showing Embodiment 12 of the present invention, illustrate a relationship between (i) relative positions of a focal point of a first lens part and a light emission center of a light source and (ii) angles at which light exits the first lens, which are observed in a case where a biconvex lens is used as the first lens in Embodiment 9 of the present invention, (a) to (c) of FIG. 22, showing Embodiment 12 of the present invention, illustrate a relationship between (i) relative positions of a focal point of a first lens part and a light emission center of a light source and (ii) angles at which light exits the first lens, which are observed in a case where a plane-convex lens is used as the first lens so that a first light exit surface is a flat surface in Embodiment 10 of the present invention.

Figure 23:
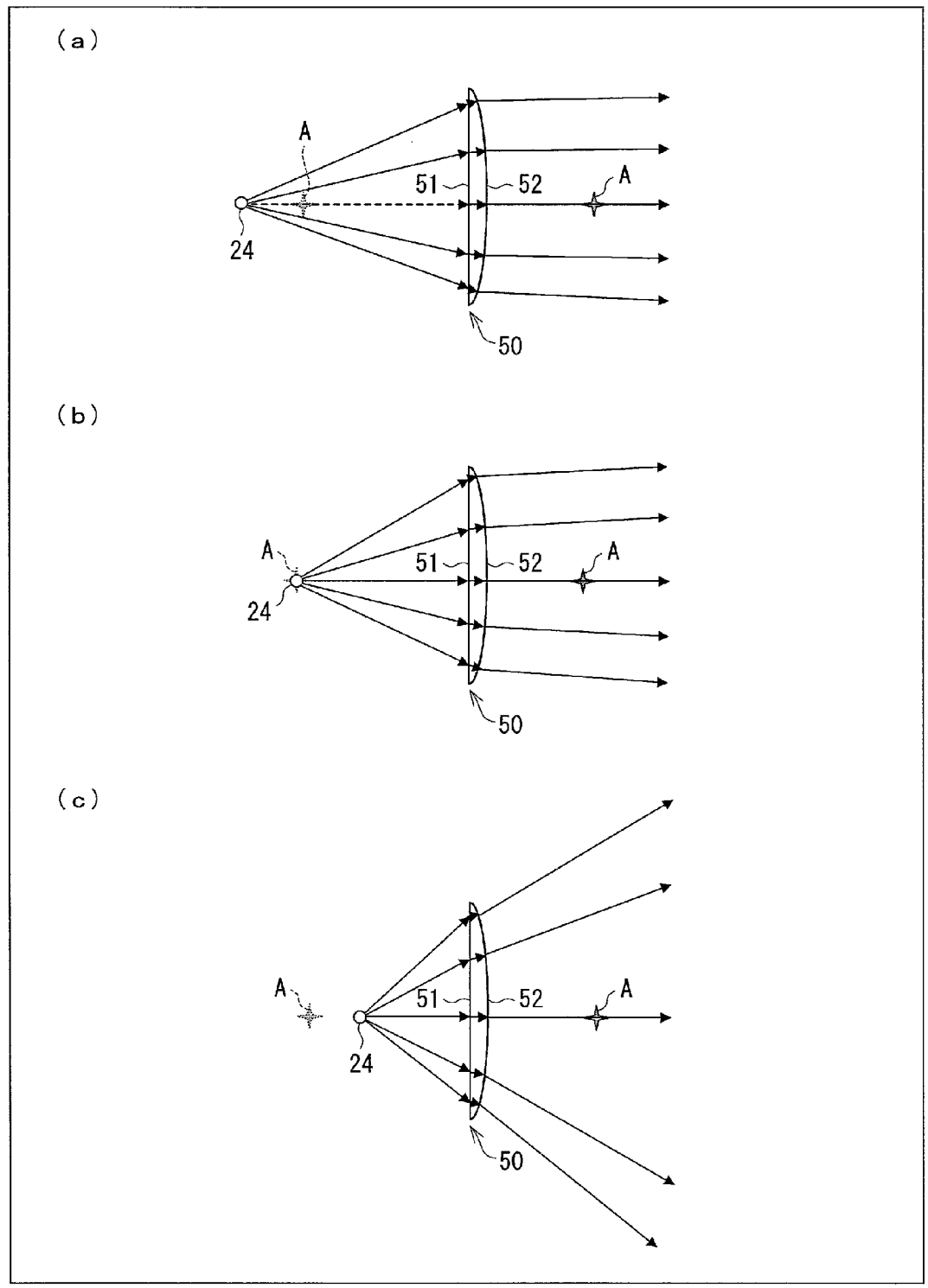

(a) to (c) of FIG. 23, showing Embodiment 12 of the present invention, illustrates a relationship between (i) relative positions of the focal point of the first lens part and the light emission center of the light source and (ii) angles of light that exits the first lens, which are observed in a case where a plane-convex lens is used as the first lens so that a first light incident surface is a flat surface in Embodiment 10 of the present invention.

Figure 24:
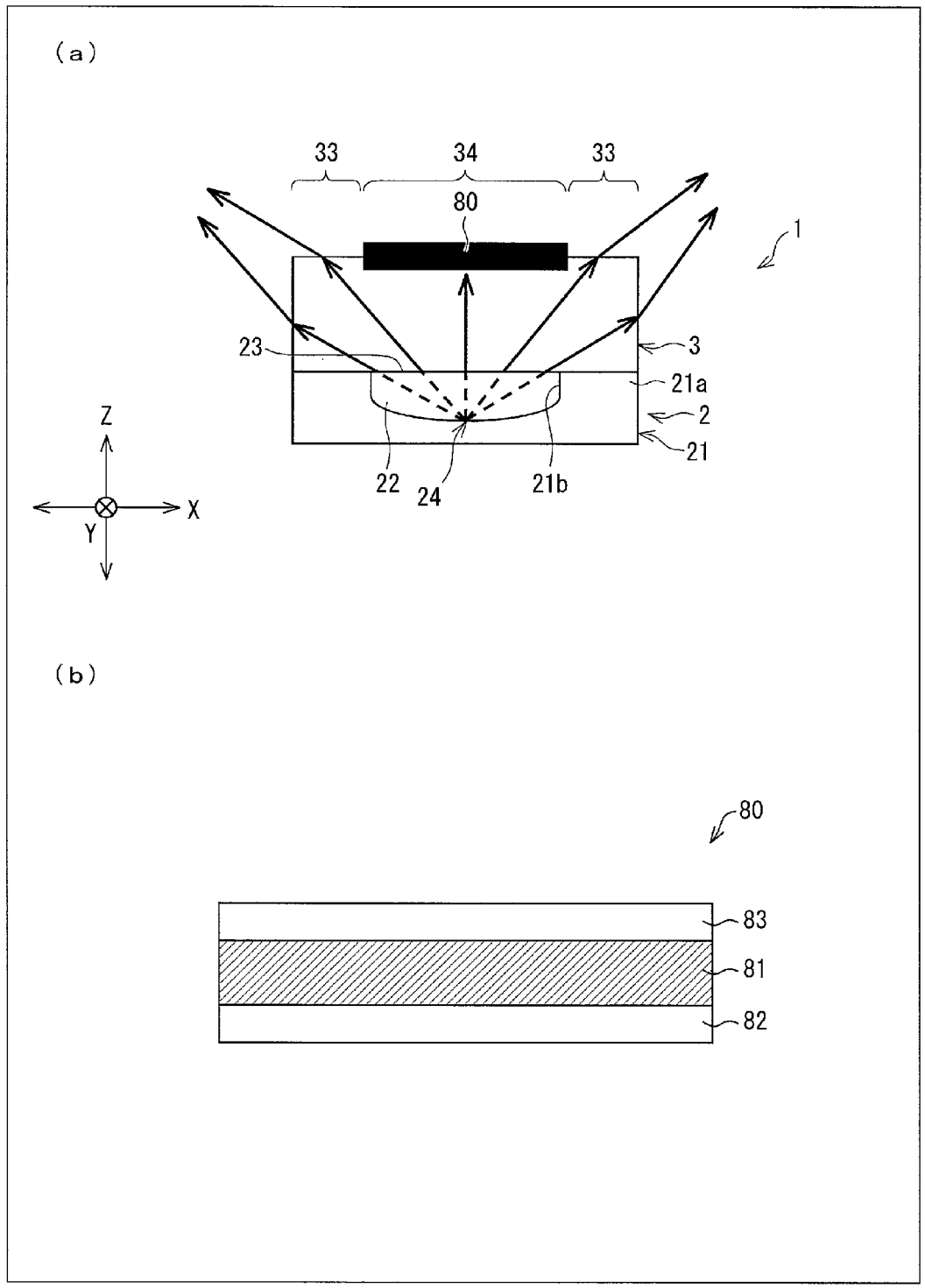

(a) of FIG. 24 is a cross-sectional view schematically illustrating a configuration of a light source unit in accordance with Embodiment 13 of the present invention, and (b) of FIG. 24 is a cross-sectional view schematically illustrating a light transmission control member in the light source unit illustrated in (a) of FIG. 24.

Figure 25:
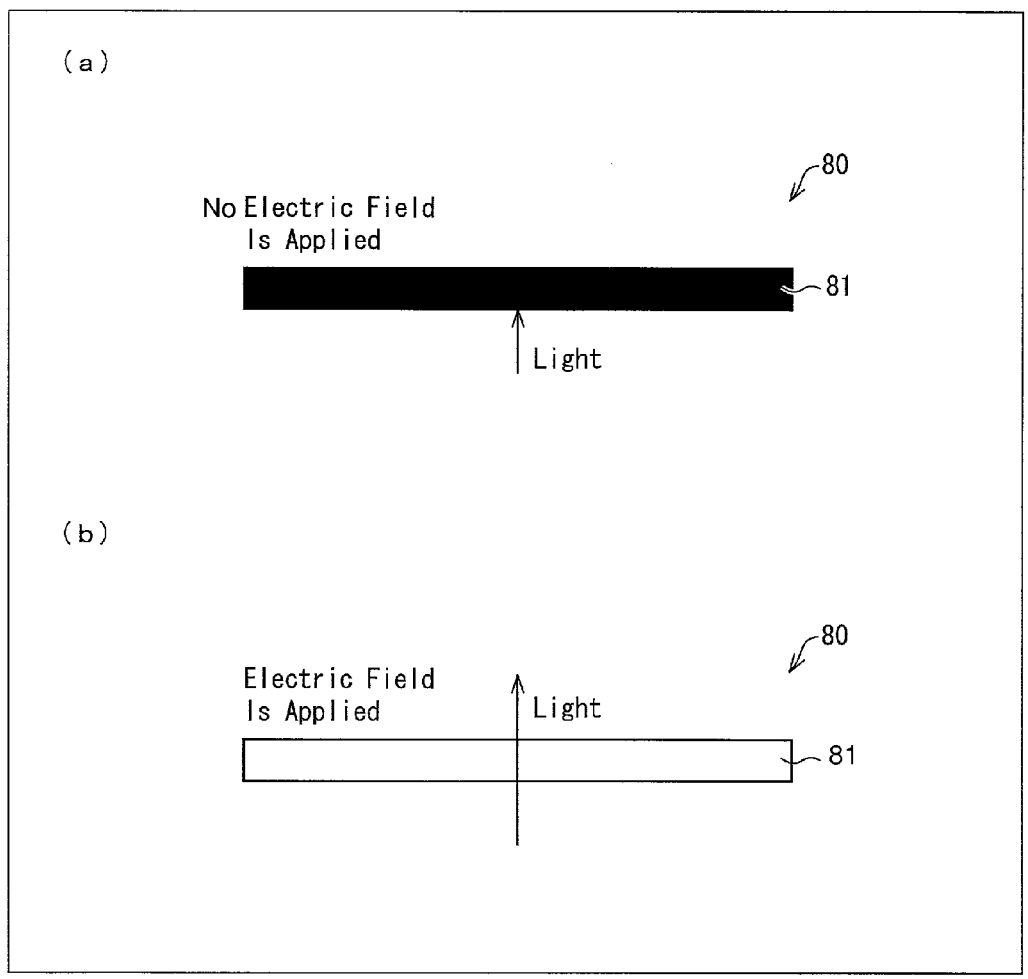

(a) of FIG. 25, showing an arrangement in which the light transmission control member is a liquid crystal shutter, illustrates a liquid crystal layer to which no electric field is applied. (b) of FIG. 25, showing the arrangement in which the light transmission control member is the liquid crystal shutter, illustrates the liquid crystal layer to which an electric field is applied.

Figure 26:
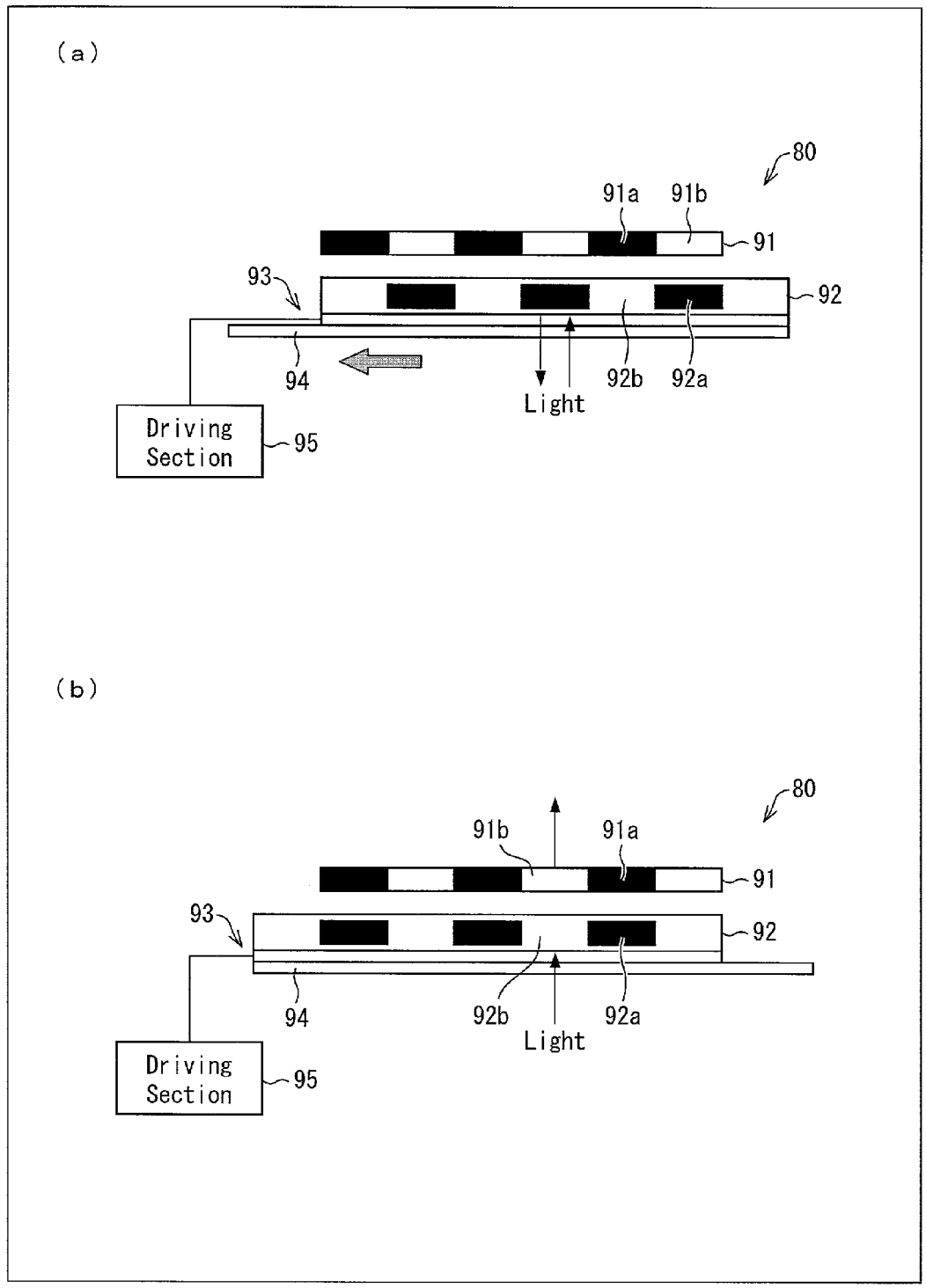

(a) and (b) of FIG. 26 illustrate a method for electrically switching between a state in which light is transmitted and a state in which light is blocked, by use of a light transmission control member in accordance with Embodiment 14 of the present invention. (a) of FIG. 26 illustrates the state in which light is blocked, and (b) of FIG. 26 illustrates the state in which light is transmitted.

Figure 27:
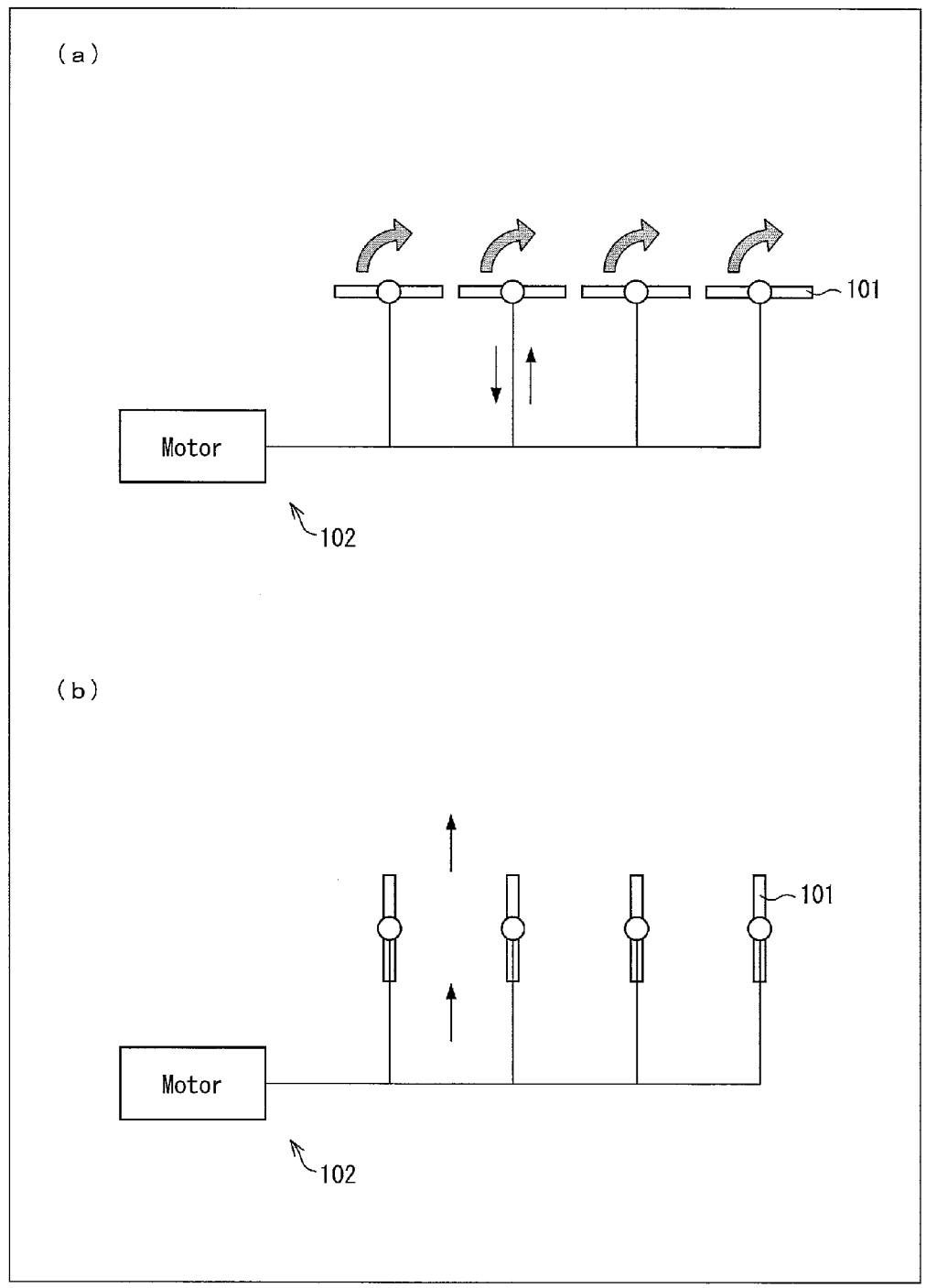

(a) and (b) of FIG. 27 illustrate a method for electrically switching between a state in which light is transmitted and a state in which light is blocked, by use of a light transmission control member in accordance with Embodiment 15 of the present invention. (a) of FIG. 27 illustrates the state in which light is blocked, and (b) of FIG. 27 illustrates the state in which light is transmitted.

Figure 28:
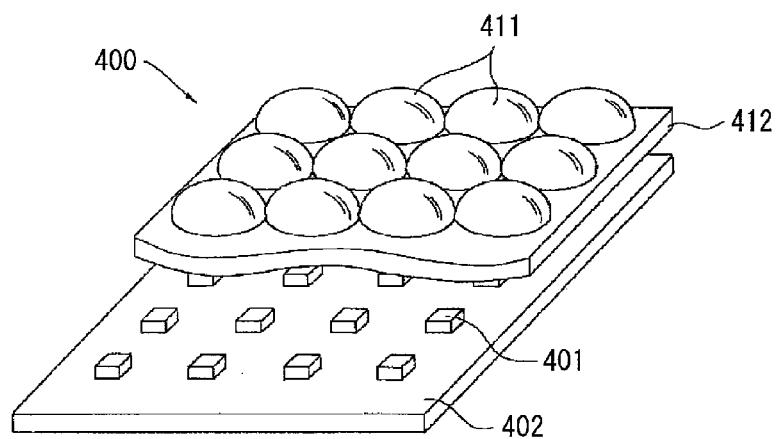

FIG. 28 is a perspective view schematically illustrating a configuration of a flat surface light source described in Patent Literature 1.

Figure 29:
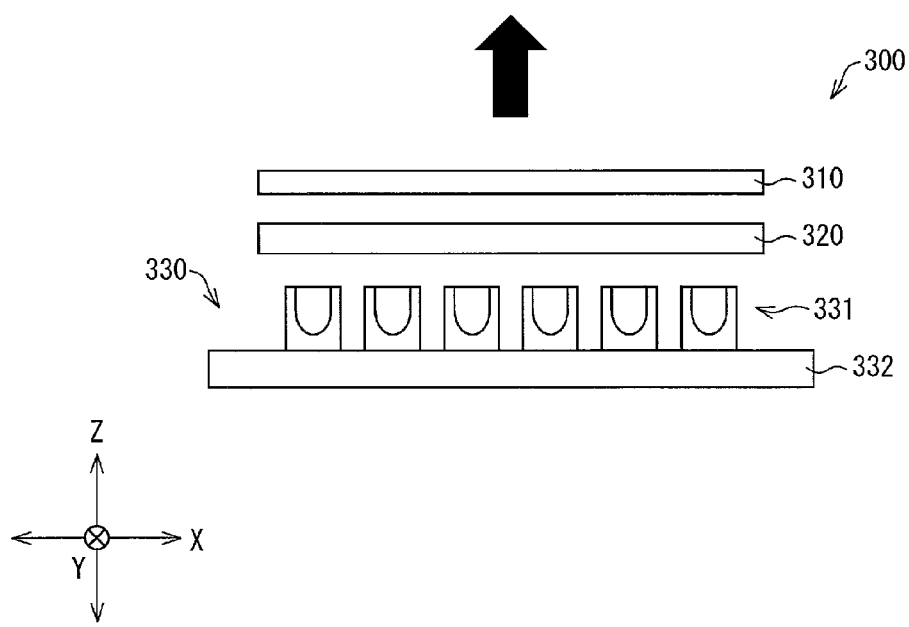

FIG. 29 is a cross-sectional view schematically illustrating a configuration of a liquid crystal display device which includes a backlight constituted by a direct surface light source device.

Figure 30:
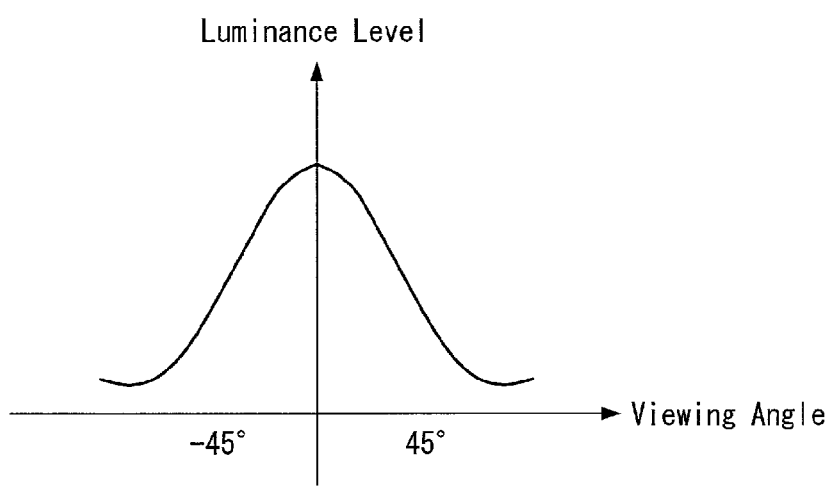

FIG. 30 is a graph showing a relationship between viewing angles and luminance levels of a liquid crystal display device including a conventional direct backlight.

DESCRIPTION OF EMBODIMENTS

The following description will discuss embodiments of the present invention in detail.

Embodiment 1

The following description discusses one embodiment of the present invention with reference to (a) and (b) of FIG. 1 to FIG. 5.

<Schematic Configuration of Light Source Unit>

Figure 1:
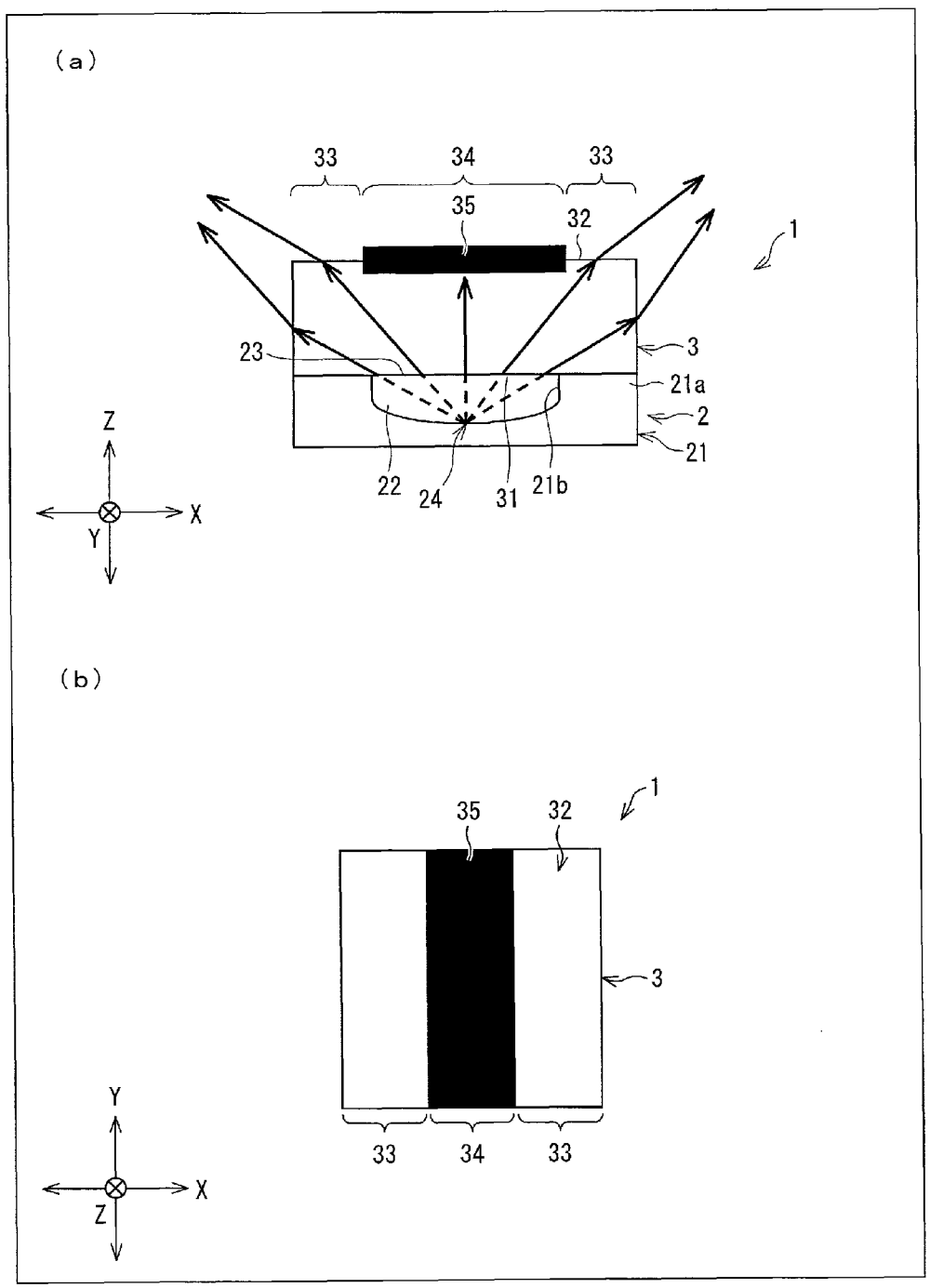

(a) of FIG. 1 is a cross-sectional view schematically illustrating a configuration of a light source unit in accordance with the present embodiment, and (b) of FIG. 1 is a plan view schematically illustrating the configuration of the light source unit in accordance with the present embodiment.

As illustrated in (a) of FIG. 1, a light source unit 1 of the present embodiment includes (i) a light source 2 and (ii) a lens cap 3 (lens) serving as a light source cover lens which covers a light-emitting surface 23 of the light source 2.

In the following description, the present embodiment deals with an example in which an LED (light emitting diode) is used as the light source 2. Note, however, that the light source 2 is not limited to the LED.

The LED used in the present embodiment is a surface mount (SMD) LED. The LED is configured such that (i) an LED element (not illustrated) is packaged with a resin mold (LED package) and (ii) the LED is integral with, by a packaging technique, a packaging substrate 21 (a first mount substrate) which has a sealing frame 21a.

The configurations of the surface mount LED and the LED element have been known. Therefore, a known LED and LED element can be used as the above LED and the LED element. For example, an LED chip described in Patent Literature 1 can be used as the above LED element.

In view of the circumstances, in such a surface mount LED, for example, a wiring board etc. having a recess 21b defined by the sealing frame 21a is used as the packaging substrate 21 (detailed description and drawing are omitted here). The sealing frame 21a used here is, for example, a reflecting plate (reflector).

The LED element is die-bonded inside the recess 21b in the packaging substrate 21 which recess is surrounded by the sealing frame 21a, and the LED element and the packaging substrate 21 are connected to each other by wire bonding.

The recess 21b is filled with, for example, a fluorescent material and a sealing resin so that the LED element is covered with the fluorescent material and the sealing resin. The fluorescent material may be (i) mixed with the sealing resin before filled in the recess 21 or (ii) filled in the recess 21 separately from the sealing resin. That is, the fluorescent material may be sealed in the recess 21b by applying a solution of the fluorescent material to the inside of the recess 21b, drying the solution, and thereafter applying the sealing resin and drying the sealing resin. Note however that, in the present embodiment, the lens cap 3 can serve as a sealing material. Accordingly, it the latter case, the sealing resin does not necessarily have to be filled in the recess 21b.

Therefore, the light source unit 1 itself can be regarded as an LED light source (LED package).

According to the present embodiment, a region surrounded by the sealing frame 21a in the LED is a light-emitting part 22 of the LED, and a surface of the light-emitting part 22 (i.e., an outer surface of the light-emitting part 22) is a light-emitting surface 23 of the LED. Furthermore, the LED element lies in a light emission center 24 of the LED (a center of light emission).

The LED may be (i) a single chip package which includes only one (1) LED element mounted in one (1) package (i.e., in the recess 21b) or (ii) a multi-chip package which includes a plurality of LED elements mounted in the recess 21b.

<Configuration of Lens Cap 3>

In the present embodiment, the lens cap 3 is provided such that an optical axis of the lens cap 3 coincides with an optical axis of the light source 2.

(a) and (b) of FIG. 1 illustrate an arrangement in which a quadrangular lens is used as the lens cap 3.

The lens cap 3 has (i) a light incident surface 31 through which light from the light source 2 enters the lens cap 3 and (ii) a light exit surface 32 through which the light that has been emitted from the light source 2 and entered the lens cap 3 through the light incident surface 31 exits. A region defined by the light incident surface 31 and the light exit surface 32 serves as a light guiding part.

The lens cap 3 is joined to the packaging substrate 21 (packaging part), which is the first mount substrate of the light source 2, so as to cover the light-emitting surface of the light source 2. In other words, the lens cap 3 is provided so as to cover a side of the light-emitting part 22 of the light source 2 to which side the light-emitting part 22 emits light. With this arrangement, the lens cap 3 lies between the light source 2 and an object to be irradiated with light (not illustrated, such an object is hereinafter referred to as an irradiation target).

The light source unit 1 irradiates the irradiation target with light that has been emitted from the light source 2 and passed through the lens cap 3.

The light incident surface 31 of the lens cap 3 is joined to the light source 2 with use of a bonding agent etc. In the example shown in (a) and (b) of FIG. 1, the light incident surface 31 of the lens cap 3 is in contact with the light-emitting surface 23 of the light source 2.

The light incident surface 31 of the lens cap 3 may be in close contact with the light-emitting surface 23 of the light source 2. Alternatively, the light incident surface 31 of the lens cap 3 and the light-emitting surface 23 of the light source 2 may be arranged with a gap (an air space, a heat flow path, etc.) such as a groove (not illustrated) for heat dissipation between them.

Note that examples of the bonding agent used here include known transparent adhesives such as epoxy resin adhesives and silicone resin adhesives.

The lens cap 3 has, in a planar view, (i) a light transmitting region 33 which transmits light from the light source 2 and (ii) a light blocking region 34 which blocks the light from the light source 2. That is, the light transmitting region 33 and the light blocking region 34 can be seen when the lens cap 3 is viewed from a light incident surface 31 (a surface of the lens) side or a light exit surface 32 (the other surface of the lens) side.

As illustrated in (a) of FIG. 1, light emitted from the light source 2 enters the lens cap 3 through the light incident surface 31 of the lens cap 3, passes through the light guiding part, and exits through the light transmitting region 33 on the light exit surface 32 of the lens cap 3.

That is, the light which has entered the lens cap 3 goes out only through the light transmitting region 33, and does not go out through the light blocking region 34.

<Material for Lens>

A main body of the lens cap 3, that is, the light transmitting region 33 which functions as a lens that transmits light, may be made from any material, provided that the material is light transparent. However, it is preferable that the light transmitting region 33 is made from a material which is optically transparent and has a refractive index higher than that of the air.

Examples of such a material include transparent resins such as: (meth)acrylic resins such as PMMA (polymethyl methacrylate); PC (polycarbonate resins); EP (epoxy resins); COP (cycloolefin resins); and silicone resins.

<Example of Light Blocking Material and Method for Forming Light Blocking Region 34>

The light blocking region 34 can be formed by, for example, applying or printing a light blocking material or bonding a premolded light blocking member to a part of the light transmitting region 33, i.e., a part of a surface of the lens cap 3.

Note that how to form the lens cap 3 is not particularly limited, and therefore the lens cap 3 can be formed by a known molding method such as injection molding or matched mold forming.

Note that (a) of FIG. 1 shows an example in which a light blocking layer 35, which is made from a light blocking material, is provided in a part of the light exit surface 32 of the lens cap 3.

<Light Blocking Material>

The light blocking material may be any material, provided that it does not transmit light. The light blocking material may be a light-absorbing material which absorbs light or a reflecting material which reflects light.

Examples of the light blocking material include (i) black materials such as black pigments and black dye, (ii) metals such as aluminum and silver, and (iii) white materials such as white plastic and white paint.

Such a light blocking material, in the form of paint or ink etc., may be applied or printed to the light exit surface 32 and then dried. Alternatively, the light blocking material may be made into a thin film such as sticky tape, adhesive tape or a film, and then bonded to the light exit surface 32. Alternatively, a technique such as vapor deposition or patterning may be used to make the light blocking layer 35 from such a light blocking material.

Alternatively, a thin film dielectric corresponding to wavelength characteristics of the light source 2 may be stacked by vapor deposition, lamination, or the like.

It is needless to say that the light blocking layer 35 made from a light blocking material may be formed (stacked) on a surface of the light transmitting region 33 as described earlier. Alternatively, the light blocking layer 35 made from a light blocking material may be formed in a recess that is made in the light transmitting region 33.

Note that, in the case where the recess is made in the light transmitting region 33 and the light blocking layer 35 made from the light blocking material is formed in the recess as described above, the following option is also available: a light blocking layer 35 that is smaller in area than the light-emitting surface 23 of the light source 2 is formed on a light incident surface 31 side, instead of the light blocking layer 35 formed on the light exit surface 32 side as illustrated in (a) of FIG. 1.

Note however that, in order to improve light use efficiency and to better ensure that light traveling in front of the light source 2 is blocked, it is further preferable that the light blocking layer 35 is provided on the light exit surface 32 side.

Also note that a transparent resin layer made from a light transmitting material and a light blocking layer made from a light blocking material may be joined together or made by casting (the transparent resin layer and the light blocking layer may be integral with each other). That is, the light blocking layer may be formed in the light guiding part of the lens cap 3.

Since the light blocking region 34 is formed by the light blocking layer made from a light blocking material like above, it is possible to easily form the light blocking region 34. Furthermore, since the configuration is simple, it is possible to produce the light blocking region 34 at low cost.

<Light Directivity>

As illustrated in (a) and (b) of FIG. 1, the light blocking region 34 lies in the center of the lens cap 3, that is, on an optical axis of the light source 2.

The light blocking region 34 is smaller in area than the light-emitting part 22 of the light source 2, that is, smaller in area than the light-emitting surface 23.

This makes it possible, as illustrated in (a) of FIG. 1, to block light travelling straight in a Z axis direction, which is a direction of the optical axis (i.e., in front of the light source 2), and thus possible to cause light that is emitted from the light source 2 and enters the lens cap 3 to be separated (divided) into beams traveling in oblique directions relative to the light source 2.

That is, since the lens cap 3 guides light from the light source 2 in oblique directions relative to the light source 2, the lens cap 3 has oblique-direction light directivity.

According to the present embodiment, the light transmitting region 33 is divided into a plurality of regions (in the example shown in (b) of FIG. 1, two regions on both sides of the light blocking region 34), in a planar view, by the light blocking region 34 so that light that is emitted from the light source 2 and enters the lens cap 3 passes through the light transmitting region 33 and is thereby separated into beams travelling in oblique directions relative to the light source 2.

Note that, hereinafter, a direction corresponding to a horizontal direction (crosswise direction) of a sheet on which (b) of FIG. 1 is illustrated is referred to as an X axis direction, a direction corresponding to a vertical direction (longitudinal direction) of the sheet is referred to as a Y axis direction, and a direction perpendicular to the sheet (direction of the optical axis of the light source 2) is referred to as the Z axis direction.

The light transmitting region 33 corresponds to an irradiation region of an irradiation target. This allows light that is emitted from the light source 2 and enters the lens cap 3 to be separated into beams travelling toward the irradiation region of the irradiation target.

As described above, the light source unit 1 of the present embodiment is configured such that the lens cap 3, by which to guide light emitted from the light source 2 in oblique directions, is provided so as to cover the light source 2.

Therefore, with use of a backlight in which a plurality of light source units 1 each including such a lens cap 3 are arranged in a plane, it is possible to cause the backlight to have its peak luminance in oblique directions.

Figure 2:
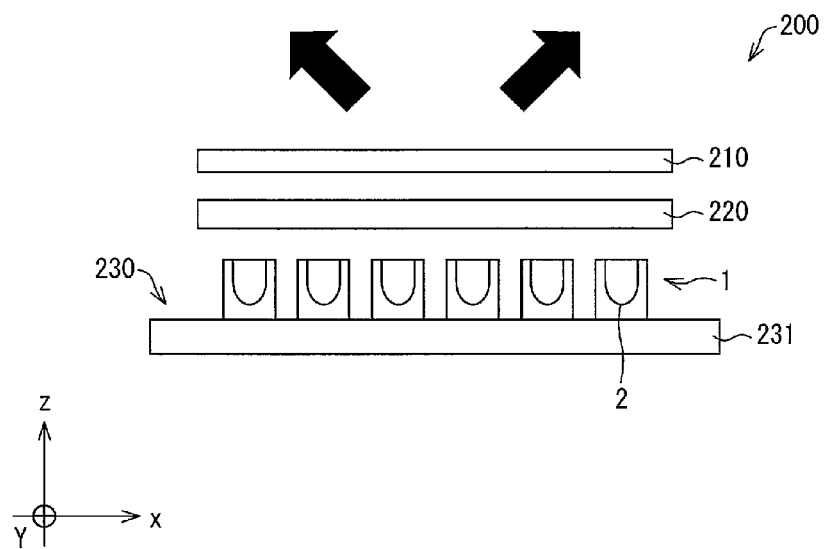
FIG. 2 is a cross-sectional view schematically illustrating a configuration of a liquid crystal display device which includes a backlight constituted by a direct surface light source device including a plurality of the light source units shown in FIG. 1.

FIG. 2 is a cross-sectional view schematically illustrating a configuration of a liquid crystal display device 200 including a backlight 230. The backlight 230 is constituted by a direct surface light source device including a plurality of light source units 1.

The liquid crystal display device 200 illustrated in FIG. 2 is the same as the liquid crystal display device 300 illustrated in FIG. 29, except that, for comparison purposes, the backlight 330 of the liquid crystal display device 300 illustrated in FIG. 29 has been replaced with the backlight 230.

The backlight 230 illustrated in FIG. 2 includes, as a light source unit, the light source units 1 illustrated in (a) and (b) of FIG. 1.

The light source units 1 are arranged in lines on a backlight substrate (not illustrated), which has substantially the same shape as a liquid crystal panel 210, such that they are in a matrix manner or a zigzag manner etc.

Furthermore, also in the liquid crystal display device 200 illustrated in FIG. 2, a reflecting member 231 like the reflecting member 332 (such as a reflecting sheet) is provided on the backlight substrate (e.g., on the entire surface of the backlight substrate) so that light is more effectively reflected at the backlight substrate.

Note that, although the lens cap 3 is not illustrated in FIG. 2 for simplification of drawing, each light source 2 is covered with a lens cap 3 as illustrated in (a) and (b) of FIG. 1. Also note that the light sources 2 used here are LEDs.

With this arrangement, light emitted from the light sources 2 passes through the lens caps 3 and then shines on an irradiation region of the liquid crystal panel 210 (irradiation target).

Furthermore, between the light source units 1 and the liquid crystal panel 210, there is provided a diffusing plate 220 for diffusing light, for the purpose of (i) preventing light and dark luminance patterns (i.e., spots of LEDs) due to bright lines attributed to the LEDs 331 and (ii) suppressing in-plane unevenness of luminance.

Note that, in FIG. 2, the arrow represents the path of light emitted from the backlight 230.

Figure 3:
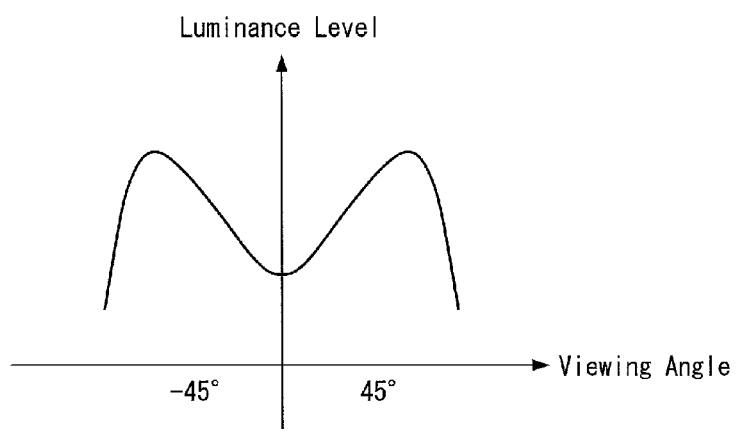
FIG. 3 is a graph showing a relationship between viewing angles and luminance levels of the liquid crystal display device including the backlight shown in FIG. 2.

FIG. 3 is a graph showing a relationship between viewing angles and luminance levels in the liquid crystal display device 200 including the backlight 230.

By using, as the direct backlight 230, a surface light source device in which a plurality of light source units 1 each including a lens cap 3 of the present embodiment are arranged in a plane as illustrated in FIG. 3, it is possible to cause the direct backlight 230 to have its peak luminance in oblique directions (e.g., ±45°).

As such, according to the present embodiment, it is possible to provide the backlight 230 which is suitable for use in, for example, a dual-view liquid crystal display device.

<Shape of Light Blocking Region 34 in a Planar View>

(b) of FIG. 1 illustrates an example in which, in a planar view, (i) the light source 2 and the lens cap 3 which covers the light source 2 are in the shape of a square and (ii) the light blocking region 34, which is in the shape of a rectangle and extends in parallel to a side of the lens cap 3 which side extends along the Y axis direction, lies in the center of the lens cap 3 along the X axis direction so that the light exit surface 32 of the lens cap 3 is divided into two parts.

With this arrangement, in the example shown in (b) of FIG. 1, two light transmitting regions 33, which are arranged along the X axis direction, are formed on opposite sides of the light blocking region 34. Each of the light transmitting regions 33 is, in a planer view, in the shape of a rectangle and has a long side parallel to the side of the lens cap 3 which side extends along the Y axis direction.

Note, however, that the shapes of the light transmitting regions 33 and the light blocking region 34 of the lens cap 3 in a planar view (in other words, a light blocking pattern of the lens cap 3 in a planar view) are not limited to the above-described shapes.

Figure 4:
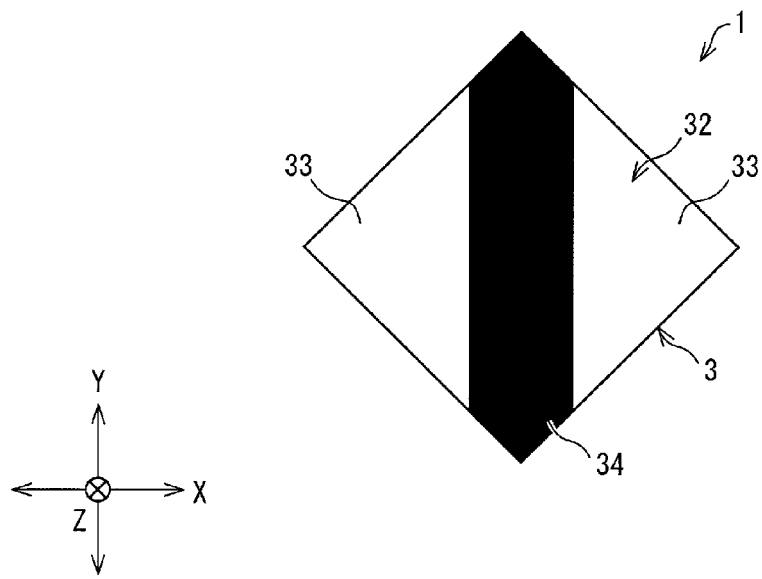
FIG. 4 is a plan view illustrating another example of the shape, which is in a planar view, of a light transmitting region and a light blocking region of a lens cap in accordance with Embodiment 1 of the present invention.
Figure 5:
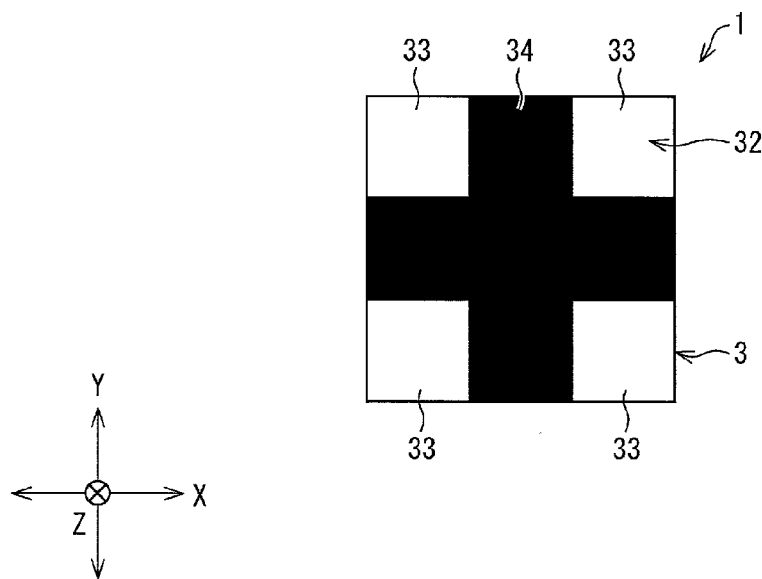
FIG. 5 is a plan view illustrating a further example of the shape, which is in a planar view, of a light transmitting region and a light blocking region of the lens cap in accordance with Embodiment 1 of the present invention.

FIG. 4 and FIG. 5 are plan views showing other examples of the shapes of the light transmitting regions 33 and the light blocking region 34 of the lens cap 3 in a planer view.

Note that, also in FIGS. 4 and 5, the lens cap 3 is in the shape of a square in a planar view. That is, the light exit surface 32 of the lens cap 3 is in the shape of a square in a planar view.

Note, however, that an example shown in FIG. 4 is arranged as follows: a strip-shaped light blocking region 34 lies on one diagonal line of the lens cap 3 in a planar view, and thereby triangular light transmitting regions 33 are formed at respective two corners of the lens cap 3 where there is no light blocking region 34 such that the light blocking region 34 is sandwiched between the light transmitting regions 33.

Furthermore, an example shown in FIG. 5 is arranged as follows: a cross-shaped light blocking region 34 lies so that a light transmitting region 33 of the lens cap 3 is divided into four parts in a planar view.

Specifically, the example shown in FIG. 5 is arranged as follows: the cross-shaped light blocking region 34 lies, along the X axis direction and the Y axis direction, so as to connect between a pair of opposite sides of the lens cap 3 and connect between another pair of opposite sides, and thereby four quadrangular light transmitting regions 33 divided by the light blocking region 34 are formed at respective corners of the lens cap 3 in a planar view.

Note, however, that the present embodiment is not limited to this. It is needless to say that the present embodiment may also be arranged as follows: a cross-shaped light blocking region 34 lies on the diagonal lines of the lens cap 3 so as to connect the corners of the lens cap 3, and thereby four triangular light transmitting regions 33 are formed each of which has a side that also serves as a side of the lens cap 3 in a planar view.

In any case, as with the case shown in (b) of FIG. 1, it is possible to block light travelling straight in a Z axis direction, which is a direction of the optical axis (i.e., in front of the light source 2), and thus possible to cause light that is emitted from the light source 2 and enters the lens cap 3 to be separated (divided) into beams traveling in oblique directions relative to the light source 2.

Furthermore, since the cross-shaped light blocking region 34 as described above makes it possible to divide light into beams traveling in four different directions, it possible to obtain (i) a light source unit 1 which is suitable for use in a backlight for a quartet-view liquid crystal display device and (ii) a lens cap 3 which can achieve such a light source unit 1.

<Modified Example of Light Source 2>

Note that, although the present embodiment deals with an example in which the surface mount LED is used as the light source 2 as described above, the light source 2 is not limited to this as described earlier.

The light source 2 used here may be an LED other than the surface mount LED, for example, may be a bullet-shaped LED.

Furthermore, although the LED used in the present embodiment is in the shape of a square when the light source 2 is viewed from its light-emitting surface 23 side (that is, viewed in a planar view) as illustrated in (b) of FIG. 1, the shape of the LED in a planar view is not limited to this. The LED may be in the shape of any quadrangle such as a diamond or a rectangle. Alternatively, the LED may be in the shape of a circle or an ellipse.

Furthermore, the light source 2 is not limited to the LED as described earlier. The light source 2 may be a solid-state light emitting element other than the LED, for example, may be a laser diode. By using as the light source 2 an LED or a solid-state light emitting element such as a laser diode, it is possible to reduce the size and thickness of a device.

Note, however, that the light source 2 is not limited to a so-called point light source such as a solid-state light emitting element. The light source 2 may be a so-called line light source such as a straight-tube light source (e.g., a cold cathode tube, a hot cathode tube). Alternatively, the light source 2 may be an incandescent lamp or a halogen lamp. The light source 2 is not limited to a particular kind.

Furthermore, the number of light sources 2 to be used in one (1) light source unit 1 is not particularly limited. For example, it is possible to employ the following arrangement: the lens cap 3 is in the shape of a rectangle in a planar view; and a plurality of light sources 2 are arranged in a region corresponding to the light blocking region 34.

As has been described, the light source unit 1 in accordance with the present embodiment is suitable for various applications which require oblique-direction light directivity, such as a backlight for a dual-view type or quartet-view type liquid crystal display device.

Embodiment 2

Another embodiment of the present invention is described below with reference to FIG. 6. The present embodiment mainly deals with a difference between the present embodiment and Embodiment 1. Note that, for convenience of description, members that have functions identical to those described in Embodiment 1 are given identical reference numerals, and are not described repeatedly.

Figure 6:
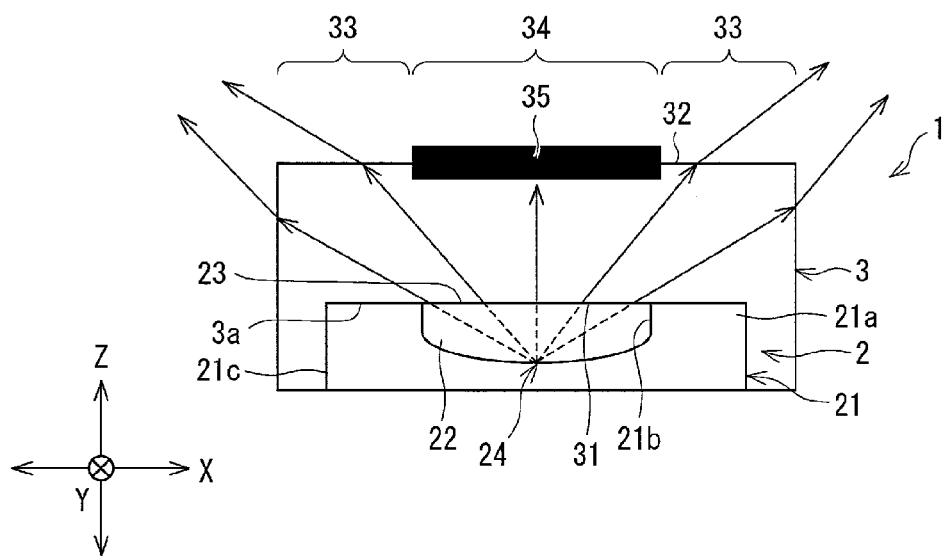
FIG. 6 is a cross-sectional view schematically illustrating a configuration of a light source unit in accordance with Embodiment 2 of the present invention.

FIG. 6 is a cross-sectional view schematically illustrating a configuration of a light source 1 in accordance with the present embodiment.

A lens cap 3 and the light source unit 1 in accordance with the present embodiment have the same configuration as the lens cap 3 and the light source unit 1 in accordance with Embodiment 1, except that the lens cap 3 in accordance with the present embodiment is different from the lens cap 3 in accordance with Embodiment 1 in its size and shape of its cross section.

Embodiment 1 dealt with an example in which, as illustrated in (a) and (b) of FIG. 1, the lens cap 3 is, in a planar view, the same in size as the packaging substrate 21 (packaging part) which is the first mount substrate of the light source 2 (in (a) and (b) of FIG. 1, the lens cap 3 is, in a planar view, the same in size as the LED which is the light source 2).

However, as described earlier, it is only necessary that the lens cap 3 cover a light-emitting part 22 (in other words, a light-emitting surface 23) of the light source 2.

Accordingly, as illustrated in FIG. 6, the lens cap 3 may be larger than the packaging substrate 21 (packaging part, the first mount substrate of the light source 2) in a planar view.

In FIG. 6, the lens cap 3 covers all the surfaces of the light source 2 including a side surface 21c of the packaging substrate 21 (first substrate), except for a terminal surface of the light source 2 (i.e., a mount surface which is to be attached to a second mount substrate such as a backlight substrate, on which mount surface the light source unit 1 is to be mounted), so as to cover a whole LED package.

According to the light source unit 1 in accordance with the present embodiment, the lens cap 3 has, on its light incident surface 31 (i.e., on its surface opposite to a light exit surface 32), a recess 3a where the light source 2 is to be placed (inserted), and the light source 2 is fitted in the recess 3a.

With this arrangement, a surface of the recess 3a which surface faces the light-emitting surface 23 of the light source 2 serves as the light incident surface 31 of the lens cap 3.

According to the present embodiment, since the lens cap 3 is large enough to cover the light source 2, a region where light is controlled (volume of the lens cap 3 itself) is large. This makes it possible to carry out more desired control of light. In particular, in a case where the lens cap 3 is large in width, light shines on a wide range.

As described above, the size of the lens cap 3 may be determined as appropriate so that a desired area of an irradiation target is irradiated with light, according to use (irradiation range) of the light source unit 1 which employs the lens cap 3, a material from which a light transmitting region 33 is made, the shape of the light exit surface 32 and the like. Therefore, as described above, the size of the lens cap 3 is not particularly limited, provided that the lens cap 3 covers the light-emitting surface 23 of the light source 2.

Note that, although the present embodiment deals with an example in which the light source 2 is fitted in the recess 3a as illustrated in FIG. 6, the present embodiment is not limited to this. The recess 3a may be larger than the light source 2.

Note that, in the case where the lens cap 3 has such a recess 3a larger than the light source 2, a light blocking layer 35 may be provided on the light incident surface 31 of the lens cap 3.

That is, in the case where the lens cap 3 has the recess 3a larger than the light source 2, a gap (space), which is an air space, is formed between the light incident surface 31 of the lens cap 3 and the light source 2.

Accordingly, the light blocking layer 35 may be formed between the light incident surface 31 of the lens cap 3 and the light source 2, instead of the light blocking layer 35 on the light exit surface 32 of the lens cap 3.

Note however that, in order to improve light use efficiency and to better ensure that light traveling in front of the light source 2 is blocked, it is further preferable, as described above, that the light blocking layer 35 is provided on the light exit surface 32 side.

Embodiment 3

Another embodiment of the present invention is described below with reference to FIG. 7. The present embodiment mainly deals with a difference between the present embodiment and Embodiment 2. Note that, for convenience of description, members that have functions identical to those described in Embodiments 1 and 2 are given identical reference numerals, and are not described repeatedly.

Figure 7:
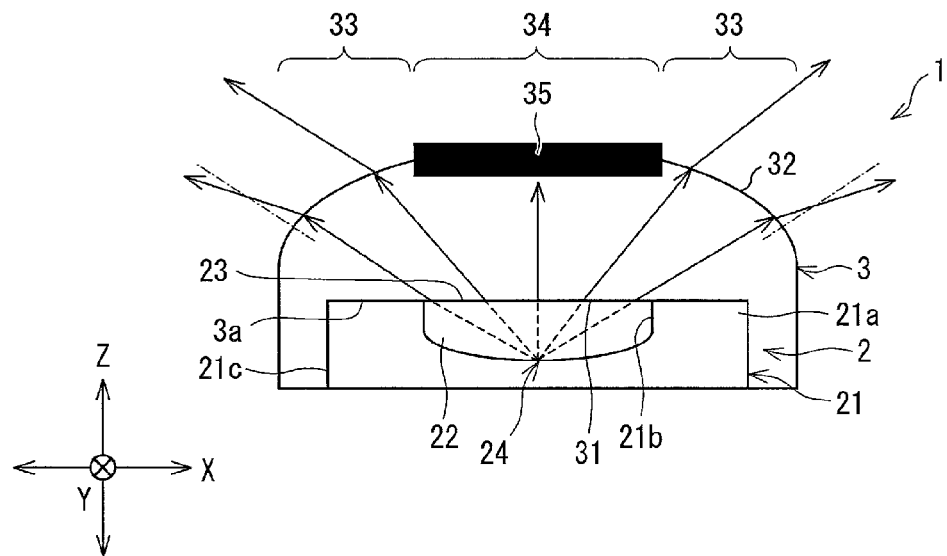
FIG. 7 is a cross-sectional view schematically illustrating a configuration of a light source unit in accordance with Embodiment 3 of the present invention.

FIG. 7 is a cross-sectional view schematically illustrating a configuration of a light source unit 1 in accordance with the present embodiment.

Embodiments 1 and 2 dealt with an example in which the light source 1 is in the shape of a quadrangle and the light exit surface 32 of the lens cap 3 is flat.

However, the shape of a cross-section of the light exit surface 32 of the lens cap 3 is not limited to this, and may be curved as illustrated in FIG. 7.

A lens cap 3 and the light source unit 1 in accordance with the present embodiment have the same configurations as the lens cap 3 and the light source unit 1 in accordance with Embodiment 2, except that the lens cap 3 in accordance with the present embodiment is in the shape of a dome that covers a light source 2 and a light exit surface 32 is a convex surface.

A dot-dash line in FIG. 7 indicates a point at which curvature of the light exit surface 32 changes. The lens cap 3 of the present embodiment is configured such that the direction of light that exits through a portion below this point travels toward the opposite side of that in the case of the lens cap 3 illustrated in FIG. 6.

Therefore, according to the present embodiment, it is possible to cause light to travel more obliquely than Embodiment 2.

Note that the curvature of the light exit surface 32 may be determined as appropriate so that (i) light is focused in oblique direction relative to the light source 2 and (ii) light is focused at desired angles, according to, for example, the size of the lens cap 3, a material from which a light transmitting region 33 is made, and the like. Therefore, the curvature is not particularly limited.

FIG. 7 illustrates an example in which (i) the lens cap 3 is larger than a packaging substrate 21 (packaging part, the first mount substrate of the light source 2) in a planar view and (ii) the light source 2 is fitted in a recess 3a in the light incident surface 31 of the lens cap 3, as with Embodiment 2.

Note, however, that the present embodiment is not limited to this. The lens cap 3 may have the recess 3a which is larger than the light source 2. Furthermore, the lens cap 3 may have the same size as the light source 2 (same size as the packaging substrate 21) in a planar view. It is needless to say that the lens cap 3 may be larger than a light-emitting surface 23 of the light source 2 but smaller than the packaging substrate 21.

The present embodiment dealt with an example in which the light exit surface 32 of the lens cap 3 has a convex shape as described above (see FIG. 7).

Note, however, that the present embodiment is not limited to this. The light exit surface 32 may have a concave shape as described in, for example, embodiments described later.

That is, in the case where the lens cap 3 has, in a planar view, a light blocking region 34 in the earlier-described manner, the light exit surface 32 may be flat or may have a curvature.

In the case where the lens cap 3 has, in a planar view, the light blocking region 34 in the above-described manner and the light exit surface 32 has a convex shape or a concave shape, (i) light that travels straight in front of the light source 2 is blocked and (ii) light is caused to travel more obliquely as compared with the case where the light exit surface 32 is flat.

Embodiment 4

Another embodiment of the present invention is described below with reference to FIG. 8. The present embodiment mainly deals with a difference between the present embodiment and Embodiment 1. Note that, for convenience of description, members that have functions identical to those described in Embodiments 1 through 3 are given identical reference numerals, and are not described repeatedly.

<Schematic Configuration of Lens Cap 3 and Light Source Unit 1>

Figure 8:
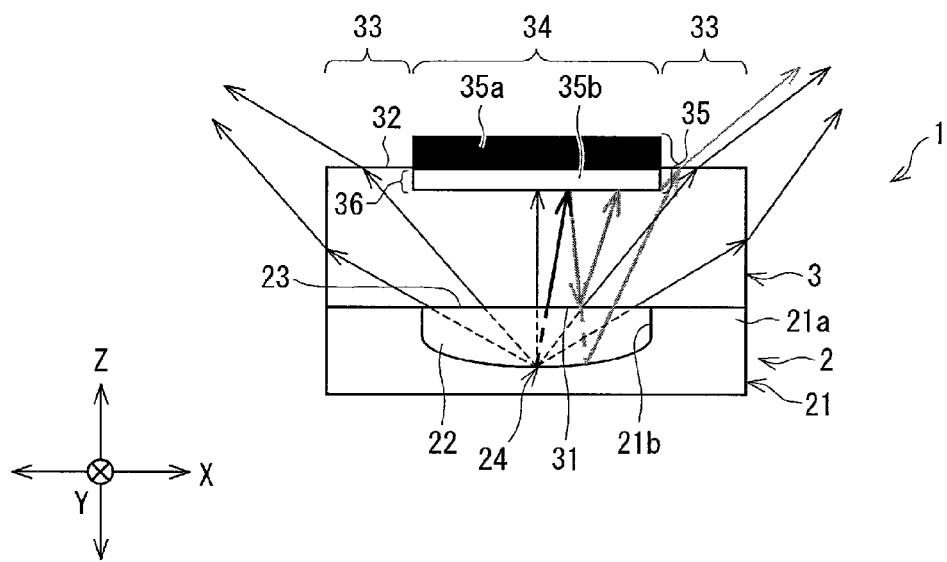
FIG. 8 is a cross-sectional view schematically illustrating a configuration of a light source unit in accordance with Embodiment 4 of the present invention.

FIG. 8 is a cross-sectional view schematically illustrating a configuration of a light source unit 1 in accordance with the present embodiment.

A lens cap 3 and the light source unit 1 in accordance with the present embodiment have the same configurations as the lens cap 3 and the light source unit 1 in accordance with Embodiment 1, except that a reflecting part 36 is provided in a light blocking region 34 of the lens cap 3 so as to face a light-emitting surface 23 of a light source 2 (see FIG. 8).

The lens cap 3 in accordance with the present embodiment is configured such that a light blocking layer 35 has, for example, a layered structure (double-layered structure) made up of (i) a first light blocking layer 35a made from a non-reflecting material and (ii) a second light blocking layer 35b made from a reflecting material (see FIG. 8).

Note, however, that the second light blocking layer 35b does not necessarily have to have the same size as the first light blocking layer 35a in a planar view. It is only necessary that the second light blocking layer 35b be provided on at least part of the first light blocking layer 35a so as to face the light-emitting surface 23 of the light source 2.

This achieves a configuration in which the reflecting part 36, constituted by the second light blocking layer 35b, is provided to at least part of the light blocking layer 35 so as to face the light-emitting surface 23 of the light source 2.

<Light Blocking Material>

The first light blocking layer 35a may be made from any material, provided that the material is a non-reflecting material that does not transmit light. Examples of such a light blocking material include light absorbing materials and black materials like those described earlier.

Furthermore, the second light blocking layer 35b may be made from any material, provided that the material is a non-reflecting material that does not transmit light. Examples of such a light blocking material include (i) metals (regular reflection materials) such as aluminum and silver and (ii) white materials (diffuse reflection materials) such as white plastic and white paint.

<One Example of Method for Forming Light Blocking Layer 35>

Accordingly, the light blocking layer 35 can be formed easily by, for example, depositing the foregoing regular reflecting material or applying white ink to at least part of one side of a piece of black tape or a black sheet.

Note, however, that the method for forming the light blocking layer 35 is not limited to this. For example, it is also possible to form the light blocking layer 35 by, for example, a combination of the method described in the present embodiment and any of the methods described in Embodiment 1.

Note that, in the case where the second light blocking layer 35b is a regular reflection layer, it is preferable that its surface is a mirror surface (smooth surface).

<Effect>

Since a side of the light blocking region 34 of the lens cap 3 which side faces the light-emitting surface 23 of the light source 2 is a white surface or a mirror surface serving as the reflecting part 36 as described above, light that travels straight in front of the light source 2 is not absorbed but reflected at a light blocking region. This makes it possible to make effective use of reflected light. Accordingly, for example, by using, as a backlight 230, a surface light source device including a plurality of such light source units 1, it is possible to increase luminance.

<Modified Example of Packaging Substrate 21>

Furthermore, a surface of the packaging substrate 21 (first mount substrate of the light source 2), in particular, a surface of the recess 21b, may be constituted by the foregoing white surface or mirror surface which serves as a reflector having, for example, a concave shape. The reflector here is positioned so that a light emission center 24 of the light source 2 is between the reflector and the lens cap 3. This makes it possible to make more effective use of light reflected by the reflector.

Accordingly, for example, by using, as the backlight unit 230, a surface light source device including a plurality of such light source units 1, it is possible to further increase luminance of the backlight 230.

<Modified Example of Light Blocking Layer 35>

FIG. 8 illustrates an example in which the reflecting part 36 is provided only on a side of the light blocking region 34 of the lens cap 3 which side faces the light-emitting surface 23 of the light source 2. However, the present embodiment it not limited to this, and therefore may be arranged such that the light blocking region 34 itself is made from a reflecting material so that the light blocking layer 35 itself serves as a reflecting layer (reflecting part 36).

Specifically, for example, the light blocking layer 35 may be made from a reflective light-blocking material as described in Embodiment 1, that is, the light blocking layer 35 may be, for example, (i) a regular reflecting layer such as aluminum or silver or (ii) a white reflecting plate or a white diffuse reflection sheet made from a white material etc. such as white plastic or white paint.

Note that, in a case where a surface light source device including a plurality of light source units 1 is used as the direct backlight unit 230, it is necessary that a diffusing plate 220 be provided between the backlight 230 and a liquid crystal panel 210 (as illustrated in FIG. 2) for the purpose of preventing spots of LEDs.

In this regard, with the above arrangement, it is possible to utilize light (LED light) that did not pass through the diffusing plate 220 and was reflected at the diffusing plate 220, because the light is reflected again at the light blocking region 34. This leads to an increase in luminance of the backlight 230.

Embodiment 5

Another embodiment of the present invention is described below with reference to FIG. 9. The present embodiment mainly deals with a difference between the present embodiment and Embodiment 1. Note that, for convenience of description, members that have functions identical to those described in Embodiments 1 through 4 are given identical reference numerals, and are not described repeatedly.

<Schematic Configuration of Lens Cap 3 and Light Source Unit 1>

Figure 9:
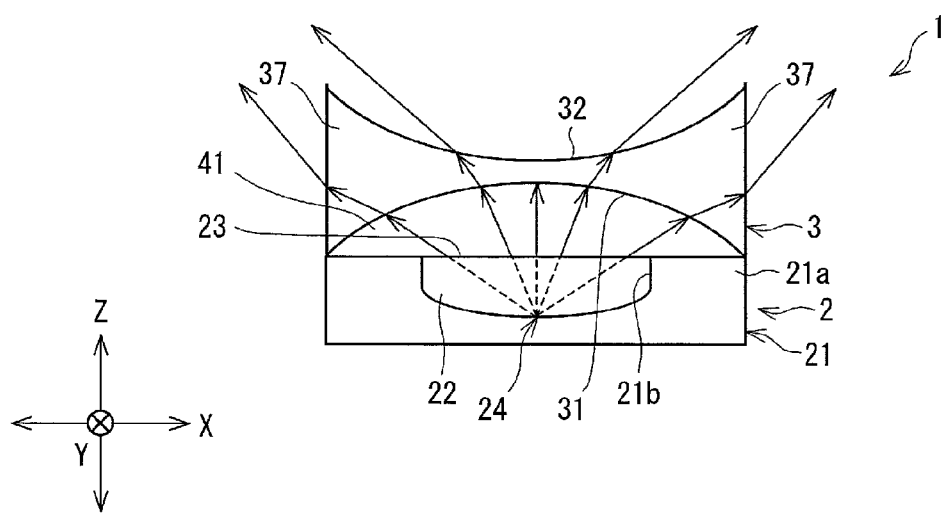
FIG. 9 is a cross-sectional view schematically illustrating a configuration of a light source unit in accordance with Embodiment 5 of the present invention.

FIG. 9 is a cross-sectional view schematically illustrating a configuration of a light source unit 1 in accordance with the present embodiment.

The light source unit 1 in accordance with the present embodiment includes, as illustrated in FIG. 9, a biconcave lens serving as a lens cap 3.

Note that, as illustrated in FIG. 9, the lens cap 3 in accordance with the present embodiment does not have a light blocking region 34.

Light emitted from a light source 2 passes through an air space 41 (space) between a light incident surface 31 of the lens cap 3 and a light-emitting surface 23 of the light source 2, enters the lens cap 3 through the light incident surface 31, passes through a light guiding part which is a main body of the lens cap 3, and goes out through a light exit surface 32 of the lens cap 3.

According to the present embodiment, since the biconcave lens is used as the lens cap 3 like above, the light incident surface 31, which has the function of a concave lens, makes it possible to diffuse the light received from the light source 2. Therefore, it is possible to cause light to travel in oblique directions relative to the light source 2 without the light blocking region 34.

Furthermore, according to the present embodiment, since the biconcave lens is used as the lens cap 3 as described above, there are protruding portions 37, each of which protrudes obliquely, at respective opposite ends of the light exit surface 32 of the lens cap 3 along the X axis direction which is perpendicular to the Y axis direction (direction of the axis of the biconcave lens) (see FIG. 9). This makes it possible to concentrate light so that the concentrated light travels in oblique directions.

As such, according to the present embodiment, it is possible to reduce light that travels in front of the light source 2 and to cause the light source unit 1 to have its peak luminance in oblique directions relative to the light source 2.

Accordingly, the light source unit 1 of the present embodiment is suitable for use in applications which require oblique-direction light directivity, such as a backlight for a dual-view liquid crystal display device.

Modified Example

FIG. 9 illustrates an example in which the light source 2 is an LED package having a quadrangular shape, as is the case with Embodiment 1.

Note however that, as described in Embodiment 1, the light source 2 is not limited to a particular kind. According to the present embodiment, the light incident surface 31 is curved in a concave shape as described earlier. Therefore, it is possible, by a concave lens effect, to diffuse light received from the light source 2.

Therefore, it is only necessary that the light source unit 1 of the present embodiment be arranged such that the light incident surface 31 of the lens cap 3 has a concave shape that is curved more sharply than the light-emitting surface 23 of the light source 2.

Note that, in the present embodiment and the subsequent embodiments, (i) curvatures of the light incident surface 31 and the light exit surface 32 of the lens cap 3 and (ii) a structure of the lens cap 3 may be determined as appropriate so that light is caused to travel in oblique directions relative to the light source 2 and the light is focused at a desired angle. Therefore, the curvatures and the structure are not particularly limited.

Note that it is necessary that (i) the curvatures of the light incident surface 31 and the light exit surface 32 of the lens cap 3 and (ii) the structure of the lens cap 3 be determined such that, with a combination of the shape of the light incident surface 31 and the shape of the light exit surface 32 of the lens cap 3, light is focused at a desired angle.

Embodiment 6

Another embodiment of the present invention is described below with reference to FIGS. 10 and 11. The present embodiment mainly deals with a difference between the present embodiment and Embodiment 5. Note that, for convenience of description, members that have functions identical to those described in Embodiments 1 through 5 are given identical reference numerals, and are not described repeatedly.

<Schematic Configuration of Lens Cap 3 and Light Source Unit 1>

Figure 10:
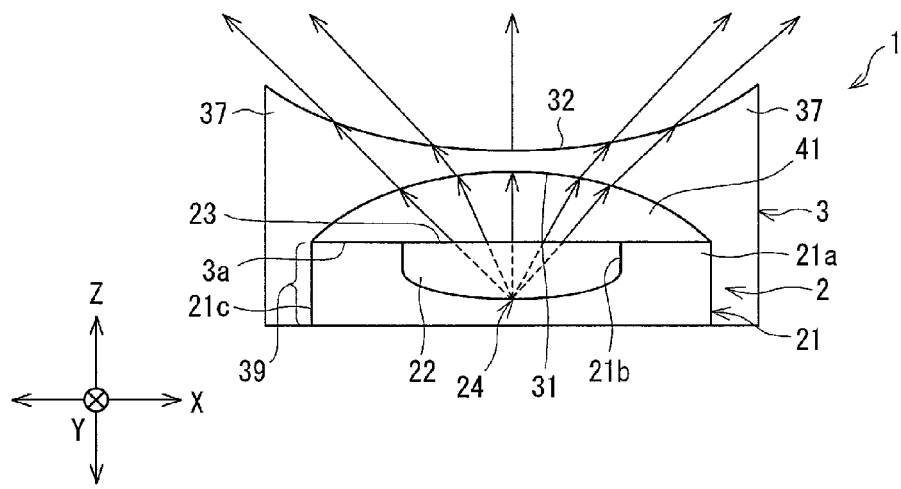
FIG. 10 is a cross-sectional view schematically illustrating an example of a configuration of a light source unit in accordance with Embodiment 6 of the present invention.

FIG. 10 is a cross-sectional view schematically illustrating an example of a configuration of the light source unit 1 of the present embodiment.

Embodiment 5 dealt with an example in which the lens cap 3 having a shape of a biconcave lens has the same size as the packaging substrate 21 (packaging part, the first mount substrate of the light source 2) in a planar view (see FIG. 9).

The light source unit 1 shown in FIG. 10 is configured such that (i) a lens cap 3 is larger in size than a packaging substrate 21 (packaging part) in a planar view and (ii) a light incident surface 31 and a light exit surface 32 of the lens cap 3 each have a concave shape.

The lens cap 3 has, in its light incident surface 31, a recess 3a in which the packaging substrate 21 of the light source 2 is to be provided. Note however that, in the present embodiment, the recess 3a is in the shape of a plane-convex cylindrical lens.

The recess 3a has a fitting part 39 in which side surfaces 21c of the packaging substrate 21 of the light source 2 are fitted. When the light source 2 is fitted in the fitting part 39, a surface of the lens cap 3 which surface faces a light-emitting surface 23 of the light source 2, that is, the light incident surface 31, is a concave surface.

In other words, the lens cap 3 of the present embodiment has the recess 3a which is made such that, when the lens cap 3 covers the light source 2, that is, when the light source 2 is fitted in the fitting part 39 of the recess 3a, an air space 41 formed between the light incident surface 31 and the light source 2 has a shape of a cylindrical lens.

Therefore, also according to the present embodiment, as is the case with Embodiment 5, since the light incident surface 31 of the lens cap 3 is curved to form a concave shape, the light incident surface 31 has the function of a concave lens and thereby diffuses light received from the light source 2.

Note that, in an example shown in FIG. 10, the light exit surface 32 of the lens cap 3 is the same as the light exit surface 32 of the lens cap 3 of Embodiment 5, except that the light exit surface 32 of the present embodiment has a curvature different from that of the light exit surface 32 of Embodiment 5 because the lens cap 3 of the present embodiment is different in size from the lens cap 3 of Embodiment 5.

Modified Example

Figure 11:
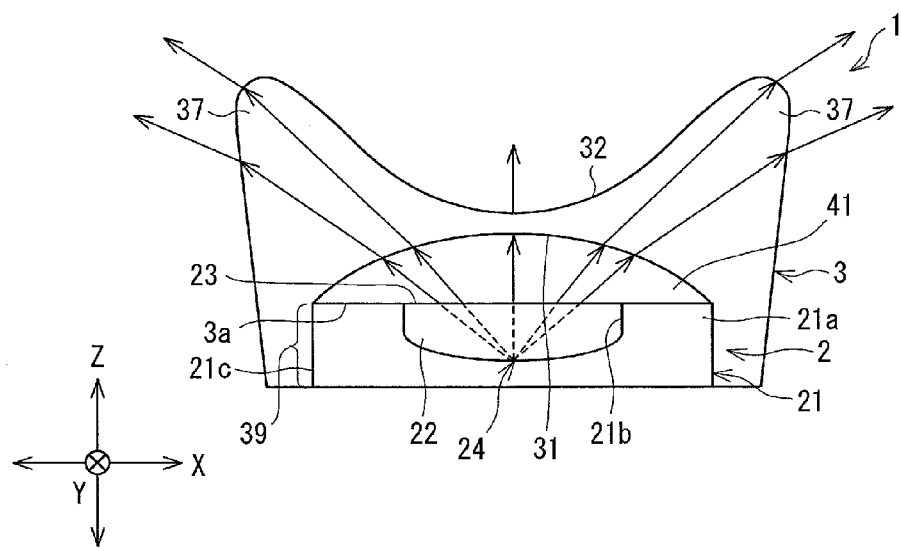
FIG. 11 is a cross-sectional view schematically illustrating another example of a configuration of the light source unit in accordance with Embodiment 6 of the present invention.

FIG. 11 is a cross-sectional view schematically illustrating another example of a configuration of the light source unit 1 in accordance with the present embodiment.

The light source unit 1 illustrated in FIG. 11 has the same configuration as the light source unit 1 illustrated in FIG. 10, except that the light exit surface 32 of the lens cap 3 has a shape different from that of the light source unit 1 illustrated in FIG. 10.

According to the light source unit 1 illustrated in FIG. 11, protruding portions 37, which protrude in oblique directions and are formed at respective opposite ends of the light exit surface 32 of the lens cap 3 along the X axis direction which is perpendicular to the Y axis direction (direction of the optical axis of the biconvex lens) each have a curvature.

As described above, the protruding portions 37 do not necessarily have to have an acute angle, provided that the protruding portions 37 are formed at the opposite ends of the light exit surface 32 of the lens cap 3 along the X axis direction and protrude in oblique directions. Therefore, as described above, each of the protruding portions 37 may have a curvature.

Note that, in the case where each of the protruding portions 37 has a curvature, the protruding portions 37 having a larger curvature diffuse light to a greater extent. Therefore, each of the protruding portions 37 preferably has a corner, and more preferably has an acute angle.

In the case where each of the protruding portions 37 has the curvature as described above, it is preferable that each of the protruding portions 37 has, at least at its top, a cross section that has an elliptic curve whose major axis is in parallel with a direction in which the each of the protruding portions 37 protrudes, when cut along the X axis (see FIG. 11). It is also preferable that the curvature is as small as possible.

Since at least a top of each of the protruding portions has an elliptic curve, it is possible to suppress light diffusion and focus light. Furthermore, it becomes easy to control directions of light by adjusting the direction in which each of the protruding portions 37 protrudes.

Embodiment 7

Another embodiment of the present invention is described below with reference to FIGS. 12 and 13. The present embodiment mainly deals with a difference between the present embodiment and Embodiments 5 and 6. Note that, for convenience of description, members that have functions identical to those described in Embodiments 1 through 6 are given identical reference numerals, and are not described repeatedly.

<Schematic Configuration of Lens Cap 3 and Light Source Unit 1>

Figure 12:
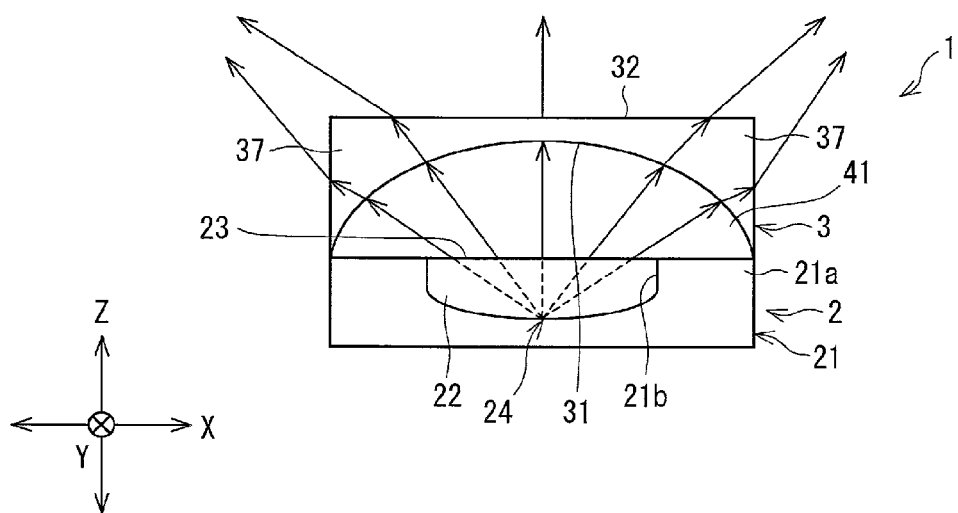
FIG. 12 is a cross-sectional view schematically illustrating an example of a configuration of a light source unit in accordance with Embodiment 7 of the present invention.
Figure 13:
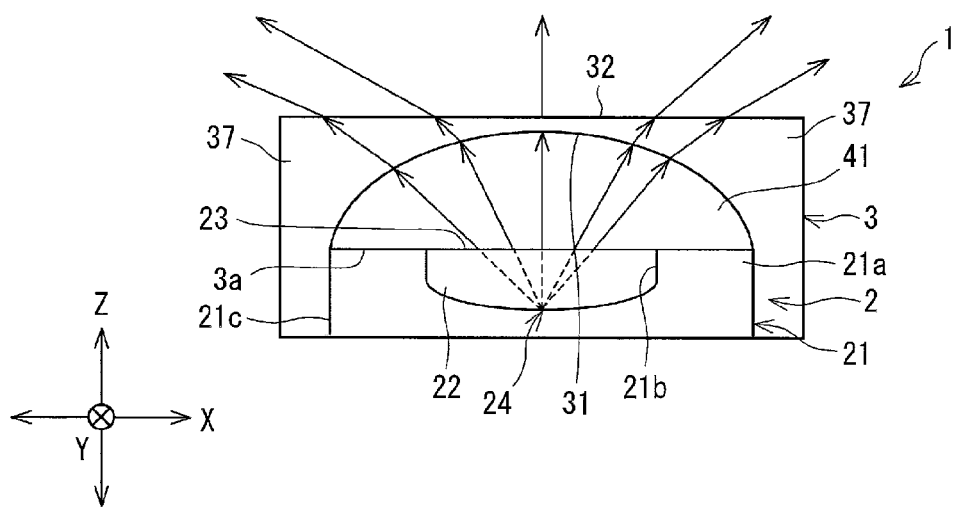
FIG. 13 is a cross-sectional view schematically illustrating another example of a configuration of the light source unit in accordance with Embodiment 7 of the present invention.

FIGS. 12 and 13 are cross-sectional views schematically illustrating examples of a configuration of a light source unit 1 of the present embodiment.

A lens cap 3 and the light source unit 1 of the present embodiment have the same configurations as the lens cap 3 and the light source unit 1 of Embodiment 5 and 6, except that a light exit surface 32 of the lens cap 3 is a flat surface as illustrated in FIGS. 12 and 13.

The lens cap 3 of the light source unit 1 shown in FIG. 12 has a shape of a plane-concave lens. The lens cap 3 of the light source unit 1 shown in FIG. 13 has a shape of a plane-concave cylindrical lens.

Note that, as illustrated in FIGS. 12 and 13, also in the present embodiment, the lens cap 3 does not have a light blocking region 34.

According to the present embodiment, a light incident surface 31 of the lens cap 3 is curved in a concave shape as is the case with Embodiment 5 or 6. Therefore, it is possible, by a concave lens effect, to diffuse light received from the light source 2 and enters the lens cap 3.

Furthermore, according to the present embodiment, since the lens cap 3 has the shape of a plane-concave lens or a plane-concave cylindrical lens in which the light exit surface 32 is a flat surface as described above, there are protruding portions 37, each of which has a corner and protrudes in an oblique direction, at opposite ends of the light exit surface 32 of the lens cap 3 along the X axis direction which is perpendicular to the Y axis direction (direction of the axis of the lens cap 3). This makes it possible to concentrate light so that the concentrated light travels in oblique directions.

As such, also in the present embodiment, it is possible to reduce light that travels in front of the light source 2 and to cause the light source unit 1 to have its peak luminance in oblique directions relative to the light source 2.

Accordingly, the light source unit 1 of the present embodiment is suitable for use in applications which require oblique-direction directivity, such as a backlight for a dual-view liquid crystal display device.

Embodiment 8

Another embodiment of the present invention is described below with reference to FIGS. 14 and 15. The present embodiment mainly deals with a difference between the present embodiment and Embodiments 5 through 7. Note that, for convenience of description, members that have functions identical to those described in Embodiments 1 through 7 are given identical reference numerals, and are not described repeatedly.

<Schematic Configuration of Lens Cap 3 and Light Source Unit 1>

Figure 14:
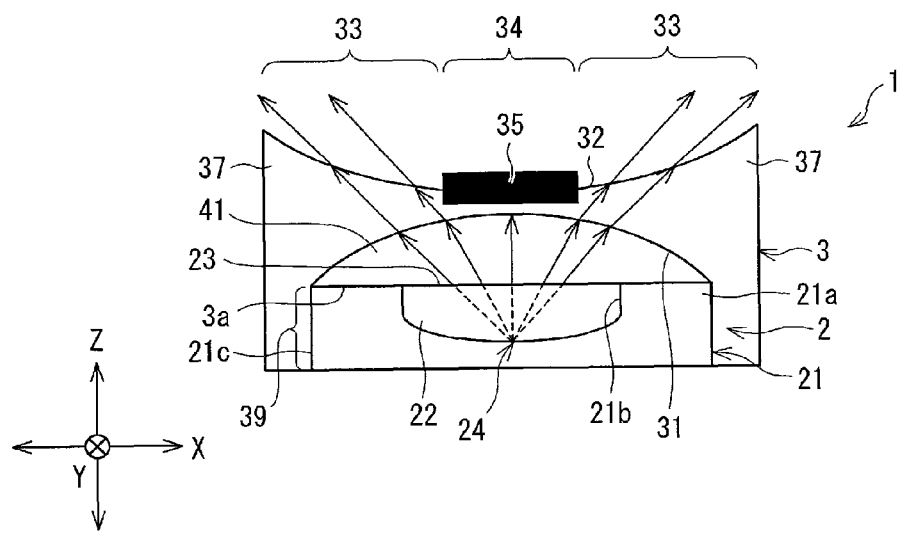
FIG. 14 is a cross-sectional view schematically illustrating an example of a configuration of a light source unit in accordance with Embodiment 8 of the present invention.
Figure 15:
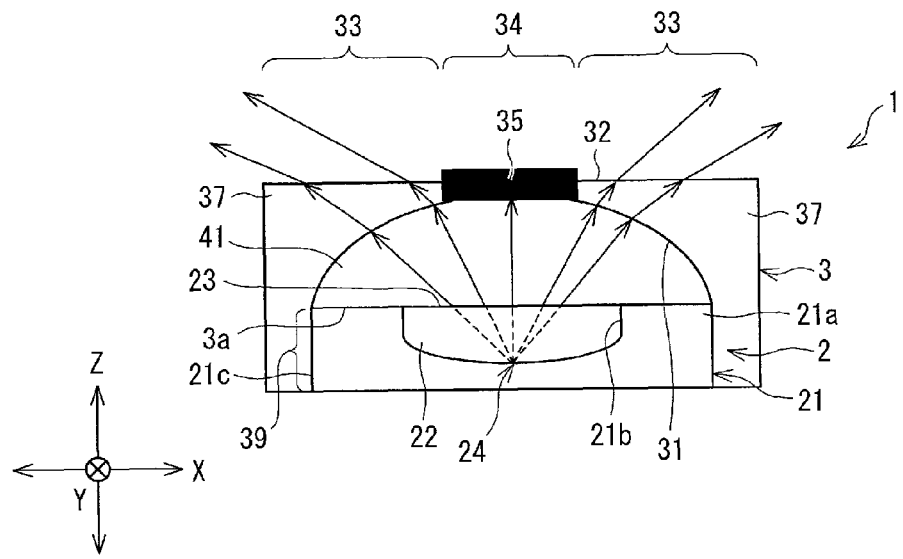
FIG. 15 is a cross-sectional view schematically illustrating another example of a configuration of the light source unit in accordance with Embodiment 8 of the present invention.

FIGS. 14 and 15 are cross-sectional views schematically illustrating examples of a configuration of a light source unit 1 of the present embodiment.

A lens cap 3 and the light source unit 1 illustrated in FIGS. 14 and 15 have the same configurations as the lens cap 3 and the light source unit 1 shown in FIG. 10 and FIG. 13, respectively, except that the lens cap 3 has a light transmitting region 33 and a light blocking region 34 which are similar to those of the lens cap 3 and the light source unit 1 in accordance with Embodiment 1, in a planar view.

Note that the light transmitting region 33 and the light blocking region 34 may have, for example, a shape shown in (b) of FIG. 1 or a shape shown in FIG. 4 or 5 in a planar view.

FIG. 14 illustrates an example in which the lens cap 3 shown in FIG. 10 has a light blocking layer 35, and FIG. 15 illustrates an example in which the lens cap 3 shown in FIG. 13 has a light blocking layer 35. Note, however, that the present embodiment is not limited to these arrangements. It is needless to say that the present embodiment may be arranged such that the lens cap 3 shown in FIG. 9, 11, or 12 has a light blocking layer 35 on its light exit surface 32.

According to the present embodiment, it is possible to achieve not only (i) an effect brought about by the shapes of the light incident surface 31 and the light exit surface 32 of the lens cap 3 described in Embodiments 5 through 7 but also (ii) an effect brought about the light blocking region 34 described in Embodiment 1. Therefore, it is possible to cause the light source unit 1 to have its peak luminance in more oblique directions.

Modified Example

Also in the present embodiment, as is the case with Embodiment 4, a reflecting part 36 may be provided in the light blocking region 34 of the lens cap 3 so as to face a light-emitting surface 23 of a light source 2. Alternatively, the light blocking region 34 itself may be formed by a reflecting material so that the light blocking layer 35 itself serves as a light reflecting layer (reflecting part 36). This brings about the same effect as that of Embodiment 4.

Embodiment 9

Another embodiment of the present invention is described below with reference to (a) and (b) of FIG. 16 and FIG. 17. The present embodiment mainly deals with a difference between the present embodiment and Embodiment 5. Note that, for convenience of description, members that have functions identical to those described in Embodiments 1 through 8 are given identical reference numerals, and are not described repeatedly.

<Schematic Configuration of Lens Cap 3 and Light Source Unit 1>

(a) of FIG. 16 is a cross-sectional view schematically illustrating a configuration of a light source unit 1 of the present embodiment, and (b) of FIG. 16 is a perspective view schematically illustrating the configuration of the light source unit 1 of the present embodiment.

As illustrated in (a) and (b) of FIG. 16, the light source unit 1 of the present embodiment includes a lens cap 3 constituted by lens parts 50 and 60 each of which is a biconvex lens. The lens parts 50 and 60 are joined together at one end 50a and one end 60a of the lens parts 50 and 60.

In the present embodiment, surfaces of the respective lens parts 50 and 60 serve as a light incident surface 31 and the other surfaces of the respective lens parts 50 and 60 serve as a light exit surface 32.

In this configuration, both surfaces of the lens part 50 (first lens part) serve as a light incident surface 51 (first light incident surface) and a light exit surface 52 (first light exit surface), respectively. The light incident surface 51 and the light exit surface 52 serve as a part of the light incident surface 31 and a part of the light exit surface 32, respectively.

Similarly, both surfaces of the lens part 60 (second lens part) serve as a light incident surface 61 (second light incident surface) and a light exit surface 62 (second light exit surface), respectively. The light incident surface 61 and the light exit surface 62 serve as a part of the light incident surface 31 and a part of the light exit surface 32, respectively.

With this configuration, as illustrated (a) and (b) of FIG. 16, the lens cap 3 has an inverted V-shaped (triangular roof shaped) cross section in which (i) the light incident surface 31 is divided into the light incident surface 51 and the light incident surface 61 by a border line 38 (see (b) of FIG. 16) that coincides with an optical axis of a light source 2 and (ii) the light exit surface 32 is constituted by the light exit surfaces 52 and 62 which face the light incident surfaces 51 and 61, respectively.

The lens parts 50 and 60 are symmetrical with respect to an imaginary plane 71 (see (b) of FIG. 16) that passes through the border line 38 and is parallel to the border line 38.

With this configuration, the light source unit 1 illustrated in (a) and (b) of FIG. 16 has, between the light source 2 and the light incident surface 31, an air space 41 (space) having a substantially triangular cross section.

Light emitted from the light source 2 passes through the air space 41, and enters the lens parts 50 and 60 through the light incident surfaces 51 and 62, respectively. Light which has entered the lens part 50 through the light incident surface 51 passes through a light guiding part (main body) of the lens part 50, and exits through the light exit surface 52 facing the light incident surface 51. Light which has entered the lens part 60 through the light incident surface 61 passes through a light guiding part (main body) of the lens part 60, and exits through the light exit surface 62 facing the light incident surface 61.

Therefore, according to the present embodiment, it is possible to reduce light that travels in front of the light source 2 and separate light into beams that travel in oblique directions relative to the light source 2, without providing the light blocking region 34 to the lens cap 3. This makes it possible to cause the light source unit 1 to have its peak luminance in oblique directions relative to the light source 2.

As such, the light source unit 1 of the present embodiment is suitable for use in applications which require oblique-direction light directivity, such as a backlight for a dual-view liquid crystal display device.

Furthermore, the light source unit 1 is arranged such that a focal point of the lens part 50 which focal point is on the light incident surface 51 side and a focal point of the lens part 60 which focal point is on the light incident surface 61 side each coincide with a light emission center 24 of the light source 2.

In (a) of FIG. 16, a line that passes through (i) the light emission center 24, (ii) a center (optical axis) of the lens part 50, and (ii) the focal points of the lens part 50 which focal points are on the light incident surface 51 side and on a light exit surface 52 side, respectively, is represented by a chain double-dashed line. Similarly, in (a) of FIG. 16, a line that passes through (i) the light emission center 24, (ii) a center (optical axis) of the lens part 60, and (iii) the focal points of the lens part 60 which focal points are on the light incident surface 61 side and on a light exit surface 62 side, respectively, is represented by another chain double-dashed line.

Furthermore, in (a) of FIG. 16, each focal point of the lens parts 50 and 60 is represented by a mark "○".

As shown in (a) of FIG. 16, a light beam from a focal point of a biconvex lens becomes a straight beam parallel to the optical axis of the biconvex lens after passing through the biconvex lens.

Therefore, as shown in (a) of FIG. 16, in the present embodiment, light which has been emitted from the light emission center 24 of the light source 2 of the light source unit 1 and entered the lens part 50 through the light incident surface 51 exits through the light exit surface 52 so as to be parallel to the optical axis of the lens part 50. Similarly, in the present embodiment, light which has been emitted from the light emission center 24 of the light source 2 of the light source unit 1 and entered the lens part 60 through the light incident surface 61 exits through the light exit surface 62 so as to be parallel to the optical axis of the lens part 60.

As such, according to the present embodiment, the light which has exited through the light exit surface 52 and the light which has exited through the light exit surface 62 each travel straight toward an irradiation area of an irradiation target without crossing the optical axis of the light source 2.

Therefore, according to the present embodiment, it is possible to efficiently cause light to exit from the lens cap 3 in oblique directions and also possible to easily control directions in which the light exits.

Modified Example (a) and (b) of FIG. 16 each illustrate an example in which a focal point of the lens part 50 which focal point is on the light incident surface 51 side and a focal point of the lens part 60 which focal point is on the light incident surface 61 side each coincide with the light emission center 24 of the light source 2. Note, however, that the present embodiment is not limited to this.

FIG. 17 is a cross-sectional view schematically illustrating a main part of the light source unit 1 of the present embodiment.

FIG. 17 schematically illustrates a relationship between (i) the light emission center 24 of the light source 2 and (ii) an imaginary focal point on an incident-surface side of the lens parts 50 and 60, in a case where a reflector 25 having a concave shape is provided so that the light emission center 24 is between the reflector 25 and the lens cap 3 (e.g., provided on a surface of a recess 21b).

As shown in FIG. 17, in the case where the reflector 25 having a concave shape is provided so that the light emission center 24 of the light source 2 is between the reflector 25 and the lens cap 3, the imaginary focal point on the incident-surface side of the lens parts 50 and 60 is formed behind the actual light emission center 24 of the light source 2, that is, the imaginary focal point is positioned so that the actual light emission center 24 is between the focal point and the lens cap 3 (see mark "○").

In the case where the reflector 25 having a concave shape is provided so that the light emission center 24 of the light source 2 is between the reflector 25 and the lens cap 3 as above, light is caused to exit from the lens parts 50 and 60 parallel to the optical axes of the lens parts 50 and 60 when the light source unit 1 is arranged such that an imaginary focal point on a side of the reflector 25 which side is opposite to the light emission center 24, on which focal point light having been emitted from the light source 2 and reflected by the reflector 25 is focused, coincides with focal points of the lens parts 50 and 60 which focal points are on the light incident surfaces 51 and 61 side.

The present embodiment deals with an example in which the lens cap 3 having a shape of biconvex lens has the same size as the packaging substrate 21 (packaging part, the first mount substrate of the light source 2) in a planar view (see FIG. 17).

Note, however, that the present embodiment is not limited to this. Also in the present embodiment, the lens cap 3 may be larger than the packaging substrate 21 (package part, the first mount substrate of the light source 2) in a planar view.

Embodiment 10

Another embodiment of the present invention is described below with reference to FIG. 18. The present embodiment mainly deals with a difference between the present embodiment and Embodiment 9. Note that, for convenience of description, members that have functions identical to those described in Embodiments 1 through 9 are given identical reference numerals, and are not described repeatedly.

<Schematic Configurations of Lens Cap 3 and Light Source Unit 1>

FIG. 18 is a cross-sectional view schematically illustrating a configuration of a light source unit 1 of the present embodiment.

A lens cap 3 and the light source unit 1 of the present embodiment have the same configurations as the lens cap 3 and the light source unit 1 illustrated in FIG. 17, except that each of the lens parts 50 and 60 has a plane-convex shape.

That is, the lens cap 3 and the light source unit 1 illustrated in FIG. 18 have the same configurations as the lens cap 3 and the light source unit 1 illustrated in FIG. 17, except that each of the light exit surfaces 52 and 62 is a flat surface.

Therefore, as with Embodiment 9, emitted from the light source 2 passes through the air space 41, and enters the lens parts 50 and 60 through the light incident surfaces 51 and 61, respectively. Light which has entered the lens part 50 through the light incident surface 51 passes through a light guiding part (main body) of the lens part 50, and exits through the light exit surface 52 facing the light incident surface 51. Light which has entered the lens part 60 through the light incident surface 61 passes through a light guiding part (main body) of the lens part 60, and exits through the light exit surface 62 facing the light incident surface 61.

Therefore, also in the present embodiment, as with Embodiment 9, it is possible to reduce light that travels in front of the light source 2 and separate light into beams that travel in oblique directions relative to the light source 2, without providing the light blocking region 34 to the lens cap 3. This makes it possible to cause the light source unit 1 to have its peak luminance in oblique directions relative to the light source 2.

Thus, the light source unit 1 of the present embodiment is suitable for use in applications which require oblique-direction light directivity, such as a backlight for a dual-view liquid crystal display device.

Note that, according to the present embodiment, since each of the light exit surfaces 52 and 62 is a flat surface as described above, a degree of diffusion of light is greater than that of the lens cap 3 and the light source unit 1 described in Embodiment 9.

Modified Example

Note that, as shown in FIG. 18, the present embodiment dealt with an example in which two plane-convex lenses are used in combination such that each of the light exit surfaces 52 and 62 is a flat surface.

Note, however, that the present embodiment is not limited to this. The two plane-convex lenses may be used in combination such that each of the light exit surfaces 52 and 62 has a convex shape.

With this arrangement, light is focused to a greater extent as compared with the case where the two plane-convex lenses are used in combination such that each of the light exit surfaces 52 and 62 is a flat surface.

Furthermore, also in the present embodiment, as with Embodiment 9, FIG. 18 illustrates an example in which the lens cap 3 has the same size as the packaging substrate 21 (packaging part, the first mount substrate of the light source 2) in a planar view.

Note however that, also in the present embodiment, the lens cap 3 may be larger than the packaging substrate 21 (packaging part) in a planar view.

Embodiment 11

Another embodiment of the present invention is described below with reference to FIGS. 19 and 20. The present embodiment mainly deals with a difference between Embodiment 10. Note that, for convenience of description, members that have functions identical to those described in Embodiments 1 through 10 are given identical reference numerals, and are not described repeatedly.

<Schematic Configuration of Lens Cap 3 and Light Source Unit 1>

FIGS. 19 and 20 are cross-sectional views schematically illustrating examples of a configuration of a light source unit 1 of the present embodiment.

A lens cap 3 and the light source unit 1 of the present embodiment have the same configurations as the lens cap 3 and the light source unit 1 described in Embodiment 10, except that each of the lens parts 50 and 60 is constituted by a Fresnel lens.

Therefore, in the same manner as in Embodiment 10, light emitted from the light source 2 passes through an air space 41 and then enters the lens parts 50 and 60 through the light incident surfaces 51 and 62, respectively. Light that has entered the light incident surface 51 passes through a light guiding part (main body) of the lens part 50, and then exits through the light exit surface 52 facing the light incident surface 51. Light that has entered the lens part 60 through the light incident surface 61 passes through a light guiding part (main body) of the lens part 60, and then exits through the light exit surface 62 facing the light incident surface 61d.

Therefore, it is possible, also in the present embodiment, to reduce light that travels in front of the light source 2 and to separate light into beams traveling oblique directions relative to the light source 2, without providing a light blocking region 34 to the lens cap 3, as is the case with Embodiment 10. This makes it possible to cause the light source unit 1 to have its peak luminance in oblique directions relative to the light source 2.

Thus, the light source unit 1 of the present embodiment is suitable for use in applications which require oblique-direction light directivity, such as a backlight for a dual-view liquid crystal display device Furthermore, according to the present embodiment, since each of the lens parts 50 and 60 is a Fresnel lens as described above, the lens parts 50 and 60 are thinner than biconvex lenses (described in Embodiment 9) and plane-convex lenses (described in Embodiment 10).

This reduces limitations on the thickness. That is, for example, even in a case where it is not possible to obtain enough space for the thickness of convex lenses for design reasons, it is possible to achieve the foregoing effect by using Fresnel lenses as the lens parts 50 and 60.

Embodiment 12

Another embodiment of the present invention is described below with reference to (a) through (c) of FIG. 21 and (a) through (c) of FIG. 23. Note that, for convenience of description, members that have functions identical to those described in Embodiments 1 through 11 are given identical reference numerals, and are not described repeatedly.

The present embodiment describes a relationship between (i) relative positions of a focal point of each of the lens parts 50 and 60 and the light emission center 24 of the light source 2 and (ii) angles at which light travels, in the light source unit 1 described in Embodiments 9 and 10.

Note that (a) through (c) of FIG. 21 and (a) through (c) of FIG. 23 each illustrate the lens part 50 as an example; however, since the lens part 50 and the lens part 60 are symmetrical with respect to the foresaid imaginary plane 71 parallel to the border line 38, the same explanation applies to the lens part 60.

Further note that, in the present embodiment, for convenience of illustration and description, the lens part 50 is regarded as a simple single-focus lens, i.e., a single-focus convex lens model having an imaginary focal point. Note however that, in order to cause collimated light to be emitted from the lens part 50, it is necessary to change curvature according to a type of a convex lens. In any of the following models, the light emission center 24 of the light source 2 lies on an optical axis of the lens part 50.

<Case where Biconvex Lens is Used>

(a) through (c) of FIG. 21, showing a case where a biconvex lens is used as the lens part 50 in Embodiment 9, illustrate a relationship between (i) relative positions of a focal point of the lens part 50 and the light emission center 24 of the light source 2 and (ii) angles at which light travels.

Note that (a) through (c) of FIG. 21 illustrate (a) a case where the light emission center 24 of the light source 2 is more distant from the lens part 50 than the focal point A is, (b) a case where the focal point A of the lens part 50 coincides with the light emission center 24 of the light source 2, and (c) a case where the light emission center 24 of the light source 2 is closer to the lens part 50 than the focal point A is, respectively.

In a case where the biconvex lens is used as the lens part 50, light which has exited from the lens part 50 is focused in the case of (a), is collimated in the case of (b), and is diffused in the case of (c).

Note that, in any case, light that is emitted from the light emission center 24 of the light source 2 and passes through the focal point A exits from the lens part 50 in a direction parallel to the optical axis of the lens part 50.

<Case where Plane-Convex Lens Whose Light Exit Surface 52 is Flat is Used>

(a) through (c) of FIG. 22, showing a case where a plane-convex lens is used as the lens part 50 such that the light exit surface 52 is flat in Embodiment 10, illustrate a relationship between (i) relative positions of a focal point of the lens part 50 and the light emission center 24 of the light source 2 and (ii) angles at which light travels.

Note that (a) through (c) of FIG. 22 also illustrate (a) a case where the light emission center 24 of the light source 2 is more distant from the lens part 50 than the focal point A is, (b) a case where the focal point A of the lens part 50 coincides with the light emission center 24 of the light source 2, and (c) a case where the light emission center 24 of the light source 2 is closer to the lens part 50 than the focal point A is, respectively.

In a case where the plane-convex lens whose first light exit surface 52 is a flat surface is used for the lens part 50, light which has exited from the lens part 50 is focused in the case of (a), is collimated in the case of (b), and is diffused in the case of (c).

Note however that, in the case of the above (a), a distance between the lens part 50 and another focal point A (not illustrated) on the first light exit surface 52 side is longer than that in the case where a biconvex lens is used as the lens part 50.

Furthermore, in the case of the above (c), a degree of diffusion of light which exits from the lens part 50 is greater than that in the case where a biconvex lens is used as the lens part 50.

<Case where Plane-Convex Lens Whose Light Incident Surface 51 is Flat is Used>

(a) through (c) of FIG. 23, showing a case where a plane-convex lens is used as the lens part 50 such that the light incident surface 51 is a flat in Embodiment 10, illustrate a relationship between (i) relative positions of a focal point of the lens part 50 and the light emission center 24 of the light source 2 and (ii) angles at which light travels.

Note that (a) through (c) of FIG. 23 also illustrate (a) case where the light emission center 24 of the light source 2 is more distant from the lens part 50 than the focal point A is, (b) a case where the focal point A of the lens part 50 coincides with the light emission center 24 of the light source 2, and (c) a case where the light emission center 24 of the light source 2 is closer to the lens part 50 than the focal point A is, respectively.

In a case where a plane-convex lens is used as the lens part 50 such that the light incident surface 51 is a flat surface, as shown in (a) through (c) of FIG. 23, a degree of diffusion of light which exits from the lens part 50 is greater in (a) to (c) of FIG. 23 than in the respective corresponding (a) to (c) in which a biconvex lens is used or a plane-convex lens is used such that the light exit surface 52 is a flat surface.

It is clear from above that, by using the light source unit 1 shown in (a) and (b) of FIG. 16 or FIG. 18, it is possible to increase the peak luminance in oblique directions to a greater extent than the case where plane-convex lenses are used in combination such that a flat surface of each of the lenses is on the light incident surface 51 side.

Furthermore, (b) of FIG. 21, (b) of FIG. 22, and (b) of FIG. 23 show that it is possible to cause light to be emitted parallel to the optical axis of the lens part 50 in a case where the focal point A of the lens part 50 coincides with the light emission center 24 of the light source 2.

Moreover, in a case where the light emission center 24 of the light source 2 is more distant from the lens part 50 than the focal point A is, in other words, in a case where the focal point A of the lens part 50, which focal point is on the light incident surface 51 side, is behind the light emission center 24 of the light source 2 when viewed from a surface of the lens part 50, the distance between the lens part 50 and the another focal point A on the light exit surface 52 side is shorter when the lens part 50 is a biconvex lens.

Therefore, in this case, by applying the light source unit 1 which satisfies such a condition to a direct backlight, it is possible to (i) reduce the thickness of a device such as a liquid crystal display device which includes the direct backlight and also (ii) increase the peak luminance in oblique directions.

Embodiment 13

Another embodiment of the present invention is described below with reference to (a) and (b) of FIG. 24 and (a) and (b) of FIG. 25. The present embodiment mainly deals with a difference between the present embodiment and Embodiment 1. Note that, for convenience of description, members that have functions identical to those described in Embodiments 1 through 12 are given identical reference numerals, and are not described repeatedly.

<Schematic Configuration of Light Blocking Region 34 of Lens Cap 3>

(a) of FIG. 24 is a cross-sectional view schematically illustrating a configuration of a light source unit 1 of the present embodiment. (b) of FIG. 24 is a cross-sectional view schematically illustrating a light transmission control member 80 in the light source unit 1 illustrated in (a) of FIG. 24.

For example, Embodiment 1 dealt with an example in which the light blocking layer 35 made from a light blocking material is provided to a part of the lens cap 3 so that the lens cap 3 has the light transmitting material region 33 and the light blocking region 34.

However, in the above case, the light blocking region 34 is fixed. Therefore, according to a liquid crystal display device 200 in which a light source unit 1 including such a lens cap 3 is used in for example a direct backlight 230, light is always separated (split).

In view of this, according to the present embodiment, the light blocking region 34 is formed electrically. That is, in the light blocking region 34, the light transmission control member 80 is provided which is configured to electrically switch between a state in which light is transmitted and a state in which light is blocked.

<Configuration of Light Transmission Control Member 80>

The light transmission control member 80 used in the present embodiment is a liquid crystal shutter.

As shown in (b) of FIG. 24, the liquid crystal shutter of the present embodiment includes, for example, (i) a liquid crystal layer 81 and (ii) a pair of transparent electrodes 82 and 83 for applying an electric field to the liquid crystal layer 81. Note that the transparent electrode 83 is preferably covered with a transparent insulating sheet (not illustrated).

According to the present embodiment, with this arrangement, as shown in (a) and (b) of FIG. 25, a state in which the liquid crystal layer 81 transmits light and a state in which the liquid crystal layer 81 blocks light are electrically switched by applying or stops applying an electric field to the liquid crystal layer 81.

(a) of FIG. 25 illustrates the light transmission control member 80, constituted by a liquid crystal shutter, in which no electric field is applied to the liquid crystal layer 81. (b) of FIG. 25 illustrates the light transmission control member 80, constituted by the liquid crystal shutter, in which an electric field is applied to the liquid crystal layer 81.

Note that, although (a) and (b) of FIG. 25 illustrate an example in which (i) light is blocked when no electric field is applied to the liquid crystal layer 81 and (ii) light is transmitted when an electric field is applied to the liquid crystal layer 81, the present embodiment is not limited to this.

A material for the liquid crystal layer 81 and a method for driving the liquid crystal layer 81 are not particularly limited, and various known liquid crystal materials and driving methods can be used.

Furthermore, although (b) of FIG. 24 illustrates an example in which a pair of transparent electrodes 82 and 83 are provided so as to sandwich the liquid crystal layer 81 therebetween, the present embodiment is not limited to this. Alternatively, for example, a pair of comb electrodes may be used as the pair of transparent electrodes 82 and 83 so as to flush with each other.

According to the present embodiment, since the light blocking region 34 is electrically switched on and off so that the state in which light is transmitted and the state in which light is blocked is switched like above, both the following two states can be achieved: (i) a state in which light emitted from the light source 2 is separated so that the light source unit 1 has its peak luminance in oblique directions as shown in (a) of FIG. 24 and (a) of FIG. 25 and (ii) a state in which light emitted from the light source 2 passes through the light blocking region 34 and travels in front of the light source 2 so that the light source unit 1 has its peak luminance in front of it as shown in (b) of FIG. 25.

Modified Example

Also in the present embodiment, as is the case with Embodiment 4, a reflecting member 36 may be provided in the light blocking region 34 by, for example, forming a reflecting layer on a side of the light blocking region 34 of the lens cap 3 which side faces the light exit surface 23 of the light source 2. This brings about the same effect as that in Embodiment 4.

Embodiment 14

Another embodiment of the present invention is described below with reference to (a) and (b) of FIG. 26. The present embodiment mainly deals with a difference between the present embodiment and Embodiment 13. Note that, for convenience of description, members that have functions identical to those described in Embodiments 1 through 13 are given identical reference numerals, and are not described repeatedly.

<Configuration of Light Transmission Control Member 80>

(a) and (b) of FIG. 26 illustrate how a light transmission control member 80 of the present embodiment electrically switches between a state in which light is transmitted and a state in which light is blocked. (a) of FIG. 26 shows the state in which light is blocked, and (b) of FIG. 26 shows the state in which light is transmitted.

As shown in (a) and (b) of FIG. 26, the present embodiment is different from Embodiment 13 in that the light transmission control member 80 provided in the light blocking region 34 is a slide shutter.

As shown in (a) and (b) of FIG. 26, the slide shutter of the present embodiment includes (i) a pair of light blocking members 91 and 92 and (ii) a slide mechanism 93 for electrically causing at least one of the light blocking members 91 and 92 to slide.

Note that, although (a) and (b) of FIG. 26 illustrate an example in which the light blocking member 91 (first light blocking member) is a fixed member and the light blocking member 92 (second light blocking member) is a movable member, the present embodiment is not limited to this.

The light blocking member 91 is constituted by alternately arranged light blocking parts 91a and light transmitting parts 91b. The light blocking member 92 is constituted by alternately arranged light blocking parts 92a and light transmitting parts 92b.

Each of the light blocking parts 91a and 92a can be constituted by, for example, (i) a light-absorbing light blocking film such as a black film or (ii) a reflection film such as a metal film.

Each of the light transmitting parts 91b and 92b can be constituted by a transparent film. The transparent film may be made from, for example, a transparent resin which is the same as a material for the lens cap 3.

The slide mechanism 93 includes, for example, (i) a slide member 94 such as a slide rail and (ii) a driving section 95 for driving the slide member 94 by repulsive force or attractive force generated by a motor, electricity or the like.

As shown in (a) of FIG. 26, the slide mechanism 93 electrically causes at least one of the light blocking members 91 and 92 to slide so that (i) the light blocking parts 91a overlap the light transmitting parts 92b and (ii) the light transmitting parts 91b overlap the light blocking parts 92a, thereby forming a light blocking part that is continuous in a planar view. This makes it possible to form the light blocking region 34 by which the light transmitting region 33 is divided (split).

Furthermore, as shown in (b) of FIG. 26, the slide mechanism 93 electrically causes at least one of the light blocking members 91 and 92 to slide so that (i) the light blocking parts 91a overlap the light blocking parts 92a and (ii) the light transmitting parts 91b overlap the light transmitting parts 92b, thereby allowing light to pass through a region where the light transmitting parts 91b and the light transmitting parts 92b overlap each other.

According to the present embodiment, since the light transmission control member 80 electrically switches between the state in which light is transmitted and the state in which light is blocked as above, both the following two states can be achieved: (i) a state in which light that travels in front of the light source 2 is blocked so that the light source unit 1 has its peak luminance in oblique directions relative to the light source 2 as shown in (a) of FIG. 26 and (ii) a state in which light emitted from the light source 2 passes through the light transmission control member 80 and travels in front of the light source 2 so that the light source unit 1 has its peak luminance in front of it as shown in (b) of FIG. 26.

Modified Example

Also in the present embodiment, as is the case with Embodiment 4, a reflecting member 36 may be provided in the light blocking region 34 by, for example, forming a reflecting layer on a side of the light blocking region 34 of the lens cap 3 which side faces the light exit surface 23 of the light source 2. This brings about the same effect as that in Embodiment 4.

Embodiment 15

Another embodiment of the present invention is described below with reference to (a) and (b) of FIG. 27. The present embodiment mainly deals with a difference between the present embodiment and Embodiments 13 and 14. Note that, for convenience of description, members that have functions identical to those described in Embodiments 1 through 14 are given identical reference numerals, and are not described repeatedly.

<Configuration of Light Transmission Control Member 80>

(a) and (b) of FIG. 27 illustrate how the light transmission control member 80 electrically switches between a state in which light is transmitted and a state in which light is blocked.

(a) of FIG. 27 shows the state in which light is blocked, and (b) of FIG. 27 shows the state in which light is transmitted.

As shown in (a) and (b) of FIG. 27, the present embodiment is different from Embodiments 13 and 14 in that the light transmission control member 80 provided in the light blocking region 34 is a rotating shutter.

As shown in (a) and (b) of FIG. 27, the rotating shutter of the present embodiment includes (i) a plurality of slats (louvers) 101 arranged in parallel to each other and (ii) a rotating mechanism 102 for rotating the plurality of slats 101 by repulsive force or attractive force generated by a motor, electricity or the like.

Such a light transmission control member 80 is configured such that the rotating mechanism 102 rotates the slats 101 to thereby change an angle of each of the slats 101 with respect to a surface of the lens cap 3.

Note here that, when the slats 101 are in such a state that their surfaces cover a surface of the lens cap 3 (e.g., a state in which the surfaces of the slats 101 are parallel to the surface of the lens cap 3) to thereby form a light blocking part that is continuous in a planar view as shown in (a) of FIG. 27, the light blocking region 34, by which the light transmitting region 33 is divided, is formed.

Furthermore, when the slats 101 are in such a state that, for example, the surfaces of the slats 101 are perpendicular to the surface of the lens cap 3 as shown in (b) of FIG. 27, light passes between the slats 101 and travels in front of the light source 2.

Also in the present embodiment, since the light transmission control member 80 electrically switches between the state in which light is transmitted and the state in which light is blocked as above, both the following two states can be achieved: (i) a state in which light that travels in front of the light source 2 is blocked so that the light source unit 1 has its peak luminance in oblique directions relative to the light source 2 as shown in (a) of FIG. 27 and (ii) a state in which light emitted from the light source 2 passes through the light transmission control member 80 and travels in front of the light source 2 so that the light source unit 1 has its peak luminance in front of it as shown in (b) of FIG. 27.

The slats 101 may be made from a light-absorbing material or a reflecting material. Furthermore, each of the slats 101 may be constituted by a stack of (i) a light transmitting layer made from a light transmitting material such as a transparent resin and (ii) a light blocking layer which is made from a light blocking material such as a light-absorbing material or a reflecting material.

Examples of the light blocking material such as a light-absorbing material and a reflecting material include the light blocking materials described in Embodiment 1 and the like.

In a case where a light transmitting layer and a light blocking layer are stacked together, how they are stacked together is not particularly limited. They may be stacked together by a known method such as vapor deposition, lamination, application, bonding, or casting.

Modified Example

Also in the present embodiment, as is the case with Embodiment 4, a reflecting member 36 may be provided in the light blocking region 34 by, for example, forming a reflecting layer on a side of the light blocking region 34 of the lens cap 3 which side faces the light exit surface 23 of the light source 2. This brings about the same effect as that in Embodiment 4.

<Brief Summary>

As has been described, a lens of one embodiment of the present invention is a lens to cover a light-emitting surface of a light source, the lens thereby guiding light from the light source in oblique directions relative to the light source, the lens including, in a planar view: a light transmitting region which transmits the light from the light source; and a light blocking region which blocks the light from the light source, the light transmitting region being divided into a plurality of light transmitting regions by the light blocking region so that the light from the light source passes through the plurality of light transmitting regions and is separated into beams traveling in different directions.

According to the configuration, it is possible to cause light emitted from the light source to be separated into beams traveling in oblique directions relative to the light source and to cause the lens provided so as to cover the light-emitting surface of the light source to have its peak luminance in the oblique directions. Therefore, it is possible to provide a lens that achieves a light source unit suitable for applications which require oblique-direction light directivity.

The lens is preferably configured such that the light blocking region is formed by, for example, a light blocking layer made from a light blocking material.

According to the configuration, since the light blocking region is formed by a light blocking layer made from a light blocking material, it is possible to easily form the light blocking region and also possible to achieve a simple configuration. Therefore, it is possible to produce, at low cost, the above lens and a light source unit including the lens.

It is preferable that the light blocking region lies in a center of the light exit surface in a planar view.

For symmetrical irradiation, the lens is provided directly below the center of the lens such that an optical axis of the lens coincides with an optical axis of the light source. In a case where the light source is covered with the lens so that the light-emitting surface of the light source is directly below the light blocking region which lies in the center of the light exit surface in a planar view, it is possible to block light which travels straight from the light source and thus possible to increase peak luminance in oblique directions.

Note that the lens covers a range of light emitted from the light source. For example, the lens is attached to, for example, a substrate on which the light source is mounted.

The lens may have, in its light incident surface, a recess in which the light source is to be provided. That is, the lens may have a size enough to cover the light source.

According to such a large lens, a region where light is controlled (volume of the lens itself) is large. This makes it possible to carry out more desired control of light. In particular, in a case where the lens is large in width, light shines on a wide range.

Furthermore, the light exit surface of the lens may have a curvature. For example, the light exit surface may have either a convex shape or a concave shape.

In a case where the lens has the light blocking region in a planar view and the light exit surface has a convex shape or a concave shape as described above, light is caused to travel more obliquely than the case where the light exit surface is a flat surface.

It is preferable that the lens further includes a light transmission control member configured to be electrically switched between a first state in which the light transmission control member transmits light and a second state in which the light transmission control member blocks light, the light transmission control member electrically forming the light blocking region.

Since the light transmission control member is electrically switched between the state in which it transmits light and the state in which it blocks light, both the following two states can be achieved: (i) a state in which light emitted from the light source is separated so that the lens provided so as to cover the light-emitting surface of the light source has its peak luminance in oblique directions and (ii) a state in which light emitted from the light source passes through the light blocking region and travels in front of the light source so that the light source unit has its peak luminance in front of it.

In this case, the lens can be configured such that: the light transmission control member is a liquid crystal shutter including (i) a liquid crystal layer and (ii) transparent electrodes for applying an electric field to the liquid crystal layer; and the light transmission control member is configured such that it forms the light blocking region by being electrically switched between a first state in which the electric field is applied to the liquid crystal layer and a second state in which the application of the electric field to the liquid crystal layer is stopped.

Alternatively, the lens can be configured such that: the light transmission control member is a slide shutter including (i) a pair of light blocking members arranged so as to overlap each other, each of which includes a light blocking part and a light transmitting part and (ii) a slide mechanism for electrically causing at least one of the pair of light blocking members to slide; and the light transmission control member is configured such that it forms the light blocking region, by which the light transmitting region is divided, when said at least one of the pair of light blocking members is caused to slide so that the light blocking parts of one of the pair of light blocking members cover the light transmitting parts of the other of the pair of light shielding members and thereby a light blocking part which is continuous in a planar view is formed.

Alternatively, the lens can be configured such that: the light transmission control member is a rotating shutter including (i) a plurality of slats arranged in parallel to each other and (ii) a rotating mechanism for rotating the plurality of slats; and the light transmission control member is configured such that it forms the light blocking region, by which the light transmitting region is divided, when an angle of the slats with respect to a surface of the lens is changed by rotation of the slats so that a light blocking part which is continuous in a planar view is formed.

The lens is preferably configured such that, in the light blocking region, a reflecting layer which reflects light is provided.

In this case, for example, the reflecting layer may be provided in the light blocking region of the lens so as to face the light emitting surface of the light source. Alternatively, the reflecting layer, which itself serves as a light blocking layer, may be provided in the light blocking region.

With the former arrangement, light that travels straight in front of the light source is not absorbed but reflected at the light blocking region. This makes it possible to make effective use of reflected light. Therefore, for example, by using, as a backlight of a liquid crystal display device, a surface light source device including a plurality of light source units each including the above lens, it is possible to increase luminance.

Note that, in a case where a surface light source device including a plurality of light source units each including the lens is used as a backlight for a liquid crystal display device, it is necessary that a diffusing plate be provided between the backlight and a liquid crystal panel. In this regard, with the latter arrangement, it is possible to use light which did not pass through the diffusing plate and was reflected at the diffusing plate, because the light is reflected again at the light blocking region. This leads to an increase in luminance of the backlight.

A lens is preferably configured to include a light incident surface of the lens, through which surface the light from the light source enters the lens, the light incident surface of the lens having a concave shape that is curved more sharply than the light-emitting surface of the light source.

According to the configuration, since the light incident surface of the lens, through which surface the light from the light source enters the lens, has a concave shape that is curved more sharply than the light-emitting surface of the light source, it is possible to cause the light from the light source to be separated into beams travelling in oblique directions relative to the light source. This makes it possible to increase the peak luminance in the oblique directions.

As described above, a lens of one embodiment of the present invention is a lens to cover a light-emitting surface of a light source, the lens thereby guiding light from the light source in oblique directions relative to the light source, including a light incident surface of the lens, through which surface the light from the light source enters the lens, the light incident surface having a concave shape that is curved more sharply than the light-emitting surface of the light source.

According to the configuration, it is possible to cause light from the light source to be separated into beams traveling in oblique directions relative to the light source and to cause the lens arranged to cover a light-emitting surface of the light source to have its peak luminance in the oblique directions. Therefore, it is possible to provide a lens that achieves a light source unit suitable for applications which require oblique-direction light directivity.

The lens is preferably configured to further include a light exit surface of the lens, through which surface the light from the light source exits, the light exit surface of the lens having, at its opposite ends along a direction perpendicular to an axis of the lens, protruding portions which protrude diagonally.

Since the lens has the protruding portions, it is possible to focus light in oblique directions. Therefore, according to the configuration, it is possible to reduce light that travels in front of the light source and possible to cause the lens provided so as to cover a light-emitting surface of the light source to have its peak luminance in oblique directions relative to the light source.

The lens can be configured, for example, such that (i) the light exit surface has a concave surface so that said lens has a shape of a biconcave lens or (ii) the light exit surface is flat so that said lens has a shape of a plane-concave lens.

According to the configuration, in either case, the light incident surface, which has the function of a concave lens, makes it possible to diffuse the light from the light source while focusing the light in the oblique directions. Therefore, according to the configuration, it is possible to reduce light that travels in front of the light source and possible to cause the lens arranged to cover a light-emitting surface of the light source to have its peak luminance in oblique directions relative to the light source 2.

The lens can be configured such that each of the protruding portions has, at least at its top, a cross section that has an elliptic curve whose major axis is in parallel with a direction in which the each of the protruding portions protrudes, when cut along a direction perpendicular to the axis of the lens.

Since each of the protruding portions has, at least at its top, a cross section that has an elliptic curve as described above, it is possible to suppress light diffusion and to focus light. Furthermore, it becomes easy to control directions in which light travels, by adjusting the direction in which each of the protruding portions protrudes.

As described above, a lens of one embodiment is a lens to cover a light-emitting surface of a light source, the lens thereby guiding light from the light source in oblique directions relative to the light source, the lens including: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line.

According to the configuration, it is possible to cause light from the light source to be separated into beams traveling in oblique directions relative to the light source and to cause the lens provided so as to cover a light-emitting surface of the light source to have its peak luminance in the oblique directions. Therefore, it is possible to provide a lens that achieves a light source unit suitable for applications which require oblique-direction light directivity.

In this case, the lens is preferably configured such that at least one of the light incident surface and the light exit surface has a convex shape.

A light beam from a focal point of a convex lens becomes a straight beam parallel to an optical axis of the convex lens after passing through the convex lens. Furthermore, in a case where (i) at least one of the light incident surface and the light exit surface has a convex shape and (ii) a first-and-second-light-incident-surfaces-side focal point of the lens is behind the center of light emission of the light source when viewed from a surface of the lens, light which exits through the first and the second light exit surfaces is focused onto an irradiation area of an irradiation target without crossing the optical axis of the light source.

Therefore, in a case where at least one of the light incident surface and the light exit surface of the lens has a convex shape, by arranging the lens such that the light emission center of the light source and the focal point has a relationship described above, it is possible to further increase the peak luminance in the oblique directions and also possible to easily control directions of light.

In this case, the lens can have a shape of two biconvex lenses joined together at their ends, wherein surfaces of the respective biconvex lenses serve as the light incident surface and the other surfaces of the respective biconvex lenses serve as the light exit surface.

Alternatively, the lens can have a shape of two plane-convex lenses joined together at their ends, wherein surfaces of the respective plane-convex lenses serve as the light incident surface and the other surfaces of the respective plane-convex lenses serve as the light exit surface.

Alternatively, the lens can have a shape of two Fresnel lenses joined together at their ends wherein surfaces of the respective Fresnel lenses serve as the light incident surface and the other surfaces of the respective Fresnel lenses serve as the light exit surface.

In this case, it is possible to reduce thickness in comparison with a case where at least one of the light incident surface and the light exit surface of the lens has a convex shape.

A light source unit of one embodiment of the present invention is a light source unit including (i) a light source and (ii) a lens which covers a light-emitting surface of a light source, the lens being any one of the lenses described above.

According to the configuration, it is possible to cause the light from the light source to be separated into beams travelling in oblique directions relative to the light source and to cause the lens provided so as to cover a light-emitting surface of the light source to have its peak luminance in the oblique directions.

Therefore, it is possible to provide a light source unit suitable for applications which require oblique-direction light directivity, such as a backlight for a dual-view or quartet-view liquid crystal display device.

It is preferable that the light blocking region lies on an optical axis of the light source in a planar view.

Since the light blocking region lies on the optical axis of the light source in a planar view, it is possible to block light that travels straight from the light source and to increase the peak luminance in the oblique directions.

Furthermore, the lens may have, in its light incident surface, a recess in which the light source is provided. That is, the lens may have a size enough to cover the light source.

According to such a large lens, a region where light is controlled (volume of the lens itself) is large. This makes it possible to carry out more desired control of light. In particular, in a case where the lens is large in width, light shines on a wide range.

A light source unit of one embodiment of the present invention is a light source unit including (i) a light source and (ii) a lens which covers a light-emitting surface of a light source, the lens being configured as below.

That is, the lens is a lens to cover a light-emitting surface of a light source, the lens thereby guiding light from the light source in oblique directions relative to the light source, the lens including: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line, at least one of the light incident surface and the light exit surface having a convex shape, and the lens having its first-and-second-light-incident-surfaces-side focal point coinciding with a center of light emission of the light source.

A light beam from a focal point of a convex lens becomes a straight beam parallel to an optical axis of the convex lens after passing through the convex lens.

Therefore, according to the configuration, light which has been emitted from the center of light emission of the light source and entered the lens through the first light incident surface exits through the first light exit surface so as to be parallel to the optical axis of the lens.

Thus, it is possible to cause the light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity.

Furthermore, the light which has exited through the first light exit surface and the light which has exited through the second light exit surface each travel straight toward an irradiation area of an irradiation target without crossing the optical axis of the light source.

Therefore, according to the configuration, it is possible to efficiently cause light to exit from the lens in the oblique directions and possible to easily control directions in which light exits.

A light source unit of one embodiment of the present invention is a light source unit including: a light source; and a lens which covers a light-emitting surface of a light source, the lens being configured as below.

That is, the lens is a lens to cover a light-emitting surface of a light source, the lens thereby guiding light from the light source in oblique directions relative to the light source, the lens comprising: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line, and at least one of the light incident surface and the light exit surface having a convex shape. The light source unit further includes a reflector having a concave shape, the reflector being positioned so that a center of light emission of the light source is between the reflector and the lens, and an imaginary focal point coinciding with a first-and-second-light-incident-surfaces-side focal point of the lens, the imaginary focal point being a point where light emitted from the center of light emission of the light source and reflected at the reflector is focused on a side of the reflector which side is opposite to the center of light emission of the light source.

A light beam from a focal point of a convex lens becomes a straight beam parallel to an optical axis of the convex lens after passing through the convex lens Therefore, according to the configuration, light which has been emitted from the center of light emission of the light source and entered the lens through the first light incident surface exits through the first light exit surface so as to be parallel to the optical axis of the lens.

Thus, it is possible to cause the light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity, such as a backlight for a dual-view or quartet-view liquid crystal display device.

Furthermore, the light which has exited through the first light exit surface and the light which has exited through the second light exit surface each travel straight toward an irradiation area of an irradiation target without crossing the optical axis of the light source.

Therefore, according to the configuration, it is possible to efficiently cause light to exit from the lens in the oblique directions and possible to easily control directions in which light exits.

A light source unit of one embodiment of the present invention is a light source including: a light source; and a lens which covers a light-emitting surface of a light source, the lens being configured as below.

That is, the lens is a lens to cover a light-emitting surface of a light source, the lens thereby guiding light from the light source in oblique directions relative to the light source, the lens comprising: a light incident surface through which the light from the light source enters the lens, the light incident surface being separated into a first light incident surface and a second light incident surface by a border line that coincides with an optical axis of the light source; and a light exit surface through which the light from the light source exits, the light exit surface having, when viewed in cross section, an inverted V shape that has a first light exit surface facing the first light incident surface and a second light exit surface facing the second light incident surface, (i) the first light incident surface and the first light exit surface and (ii) the second light incident surface and the second light exit surface being arranged so as to be symmetrical with respect to a plane that passes through the border line and is parallel to the border line, and a first-and-second-light-incident-surfaces-side focal point of the lens being positioned behind a center of light emission of the light source when viewed from a surface of the lens.

According to the configuration, light which has entered the lens through the first light incident surface exits through the first light exit surface, and light which has entered the lens through the second light incident surface exits through the second light exit surface.

Thus, it is possible to cause light from the light source to be separated into beams travelling in oblique directions relative to the light source and to cause the lens provided so as to cover the light-emitting surface of the light source to have its peak luminance in the oblique directions.

Therefore, according to the configuration, it is possible to provide a light source unit suitable for applications which require oblique-direction light directivity, such as a backlight for a dual-view or quartet-view liquid crystal display device.

Furthermore, according to the configuration, since a focal point of the lens, which focal point is on the first and second light incident surfaces side, is behind the center of light emission of the light source when viewed from a surface of the lens, light which exits through the first and second light exit surfaces is focused in an irradiation region of an irradiation target without crossing the optical axis of the light source. Therefore, it is possible to further increase the peak luminance in oblique directions and also possible to easily control a direction in which light exits.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is applicable to a light source unit and a light source cover lens each of which is suitable for applications which require oblique-direction light directivity, such as a backlight for a dual-view or quartet-view liquid crystal display device.

REFERENCE SIGNS LIST

1 Light source unit
2 Light source
3 Lens cap (lens)
3a Recess
21 Packaging substrate
21a Sealing frame
21b Recess
21c Side surface
22 Light-emitting part
23 Light-emitting surface
24 Light emission center
25 Reflector
31 Light incident surface
32 Light exit surface
33 Light transmitting region
34 Light blocking region
35 Light blocking layer
35a First light blocking layer
35b Second light blocking layer
36 Reflecting section
37 Protruding portion
38 Border line
39 Fitting part
41 Air layer
50 Lens part (first lens part)
50a, 60a End of lens
51 Light incident surface (first light incident surface)
52 Light exit surface (first light exit surface)
60 Lens part (second lens part)
61 Light incident surface (second light incident surface)
62 Light exit surface (second light exit surface)
71 Imaginary plane
80 Light transmission control member
81 Liquid crystal layer
82, 83 Transparent electrode
91 Light blocking member (first light blocking member)
92 Light blocking member (second light blocking member)
91a, 92a Light blocking part
91b, 92b Light transmitting part
93 Slide mechanism
94 Slide member
95 Driving section
101 Slat
102 Rotating mechanism
200 Liquid crystal display device
210 Liquid crystal panel
220 Diffusing plate
230 Backlight
231 Reflecting member
A Focal point

The invention claimed is:

1. A lens to cover a light-emitting surface of a light source, the lens thereby guiding light from the light source in oblique directions relative to the light source, the lens comprising, in a planar view:
   a light transmitting region which transmits the light from the light source;
   a light blocking region which blocks the light from the light source, the light transmitting region being divided into a plurality of light transmitting regions by the light blocking region so that the light from the light source passes through the plurality of light transmitting regions and is separated into beams traveling in different directions; and
   a light transmission control member that is electrically switched between a first state in which the light transmission control member transmits light and a second state in which the light transmission control member blocks light, wherein
   the light transmission control member electrically forms the light blocking region,
   the light transmission control member includes a slide shutter including (i) a pair of light blocking members arranged so as to overlap each other, each of which includes a light blocking portion and a light transmitting portion and (ii) a slide mechanism that electrically causes at least one of the pair of light blocking members to slide, and
   the light transmission control member is configured such that it forms the light blocking region, by which the light transmitting region is divided, when said at least one of the pair of light blocking members is caused to slide so that the light blocking portions of one of the pair of light blocking members cover the light transmitting portions of the other of the pair of light shielding members and thereby a light blocking portion which is continuous in a planar view is formed.

2. The lens as set forth in claim 1, wherein, in the light blocking region, a reflecting layer which reflects light is provided.

3. A light source unit comprising:
   a light source; and
   a lens which covers a light-emitting surface of the light source,
   the lens being a lens recited in claim 1.

4. A lens to cover a light-emitting surface of a light source, the lens thereby guiding light from the light source in oblique directions relative to the light source, the lens comprising, in a planar view:
   a light transmitting region which transmits the light from the light source;
   a light blocking region which blocks the light from the light source, the light transmitting region being divided into a plurality of light transmitting regions by the light blocking region so that the light from the light source passes through the plurality of light transmitting regions and is separated into beams traveling, in different directions; and
   a light transmission control member configured to be electrically switched between a first state in which the light transmission control member transmits light and a second state in which the light transmission control member blocks light, wherein
   the light transmission control member electrically forms the light blocking region,
   the light transmission control member is a rotating shutter including (i) a plurality of slats arranged in parallel to each other and (ii) a rotating mechanism that rotates the plurality of slats; and
   the light transmission control member is configured such that it forms the light blocking region, by which the light transmitting region is divided, when an angle of the slats with respect to a surface of the lens is changed by rotation of the slats so that a light blocking part which is continuous in a planar view is formed.

5. The lens as set forth in claim 4, wherein, in the light blocking region, a reflecting layer which reflects light is provided.

6. A light source unit comprising:
   a light source; and
   a lens which covers a light-emitting surface of the light source,
   the lens being a lens recited in claim 4.

* * * * *